United States Patent [19]
Ueda et al.

[11] Patent Number: 5,761,644
[45] Date of Patent: Jun. 2, 1998

[54] ELECTRONIC SECRETARY SYSTEM WITH ANIMATED SECRETARY CHARACTER

[75] Inventors: Toru Ueda, Ichihara; Yasuko Matsuoka, Chiba, both of Japan

[73] Assignee: Sharp Kabushiki Kaisha, Osaka, Japan

[21] Appl. No.: 514,092

[22] Filed: Aug. 11, 1995

[30] Foreign Application Priority Data

Aug. 11, 1994 [JP] Japan .................................. 6-189519

[51] Int. Cl.⁶ .................................................. G06F 17/60
[52] U.S. Cl. ............................................................ 705/1
[58] Field of Search ............................ 395/201, 211; 705/1, 7, 8, 9, 11

[56] References Cited

U.S. PATENT DOCUMENTS

| | | | |
|---|---|---|---|
| 5,033,804 | 7/1991 | Faris | 312/223.3 |
| 5,063,600 | 11/1991 | Norwood | 382/186 |
| 5,245,532 | 9/1993 | Mourier | 364/400 |
| 5,377,309 | 12/1994 | Sonobe et al. | 395/76 |
| 5,621,727 | 4/1997 | Vaudreuil | 370/401 |

FOREIGN PATENT DOCUMENTS

| | | |
|---|---|---|
| 0438017 | 7/1991 | European Pat. Off. . |
| 0562995 | 9/1993 | European Pat. Off. . |
| 56378 | 1/1993 | Japan . |
| 668063 | 3/1994 | Japan . |
| 9101022 | 1/1991 | WIPO . |
| 9314844 | 8/1993 | WIPO . |

OTHER PUBLICATIONS

Marcus A. et al., "User–Interface Developments for the Nineties", *Computer*, pp. 49–57, vol. 24, No. 9, Sep. 1, 1991.

*Primary Examiner*—Edward R. Cosimano
*Assistant Examiner*—Barton L. Bainbridge

[57] ABSTRACT

The electronic secretary system comprises an input section (101) for inputting operation information; a processing section (102) for performing a predetermined processing in accordance with the input information; a data storing section (103) for storing the input information; an internal state memory section (104) for memorizing the state of processing; an action description storing section (106) for storing the action description of an electronic secretary; an action data storing section (107) for storing data, such as an action image, a voice, or the like of the electronic secretary; an electronic secretary generation section (105) for deciding and generating an action of the electronic secretary in accordance with the internal state; a display section (108) for displaying an output of the processing section (102) and an output of the electronic secretary generation section (105); an interface (109) for transmitting data with other equipment; and an interpreter section 110 for interpreting the transmitted data.

11 Claims, 55 Drawing Sheets

FIG. 2

| Internal state | Electronic secretary action |
|---|---|
| Communication start transmit | Action of telephoning |
| Communication start receive | Action of receiving the telephone<br>Reproduce: "This is (user name) secretary speaking |
| Request transmit | Reproduce: "This is (user name) secretary speaking. There's a request from (user name)." |
| Request receive | Reproduce: "I've understood. I'll tell (user name) so." |
| Retrieval result transmit | Reproduce: "I'll send the retrieved results." |
| Retrieval result receive | Reproduce: "I'm obliged to you." |
| Communication end transmit | Action of hanging up the telephone. |
| Communication end receive | Action of hanging up the telephone. |
| Retrieval start | Reproduce: "Please, input a keyword." |
| Communication partner | Reproduce: "Whom would you like to ask?" |
| During retrieval | Action of leafing a book. |
| Retrieval end | Action of raising one hand. |
| Retrieval result | Reproduce: "The retrieved results are ready." |
| Request end | Action of raising one hand. |
| Request response | Reproduce: "There've been a request (for retrieval) from (user name)." |
| Wink | Action of closing and opening an eye quickly. |
| Help | Output a help screen. |

FIG. 33

```
02456  14:31, Jul. 12, 1994:  To Mr. Yamashita (id 02942) and
                              Mr. Kawai (id 01345), a schedule
                              request
                     Content: Application development meeting
                              at 1st conference room from 15:00
                              to 17:00, July 21.

02457  15:03, Jul. 12, 1994:  To Mr. Kasai (id 03428), a
                              retrieval is asked.
                     Content: Procedure for purchasing consumer
                              goods.

02458  15:12, Jul. 12, 1994:  Message from Mr. Yamashita
                              (id 02942), answer of OK for
                              (No.02456)

02459  15:20, Jul. 12, 1994:  From Mr. Kasai (id 03428), the
                              retrieved results arrived.
```

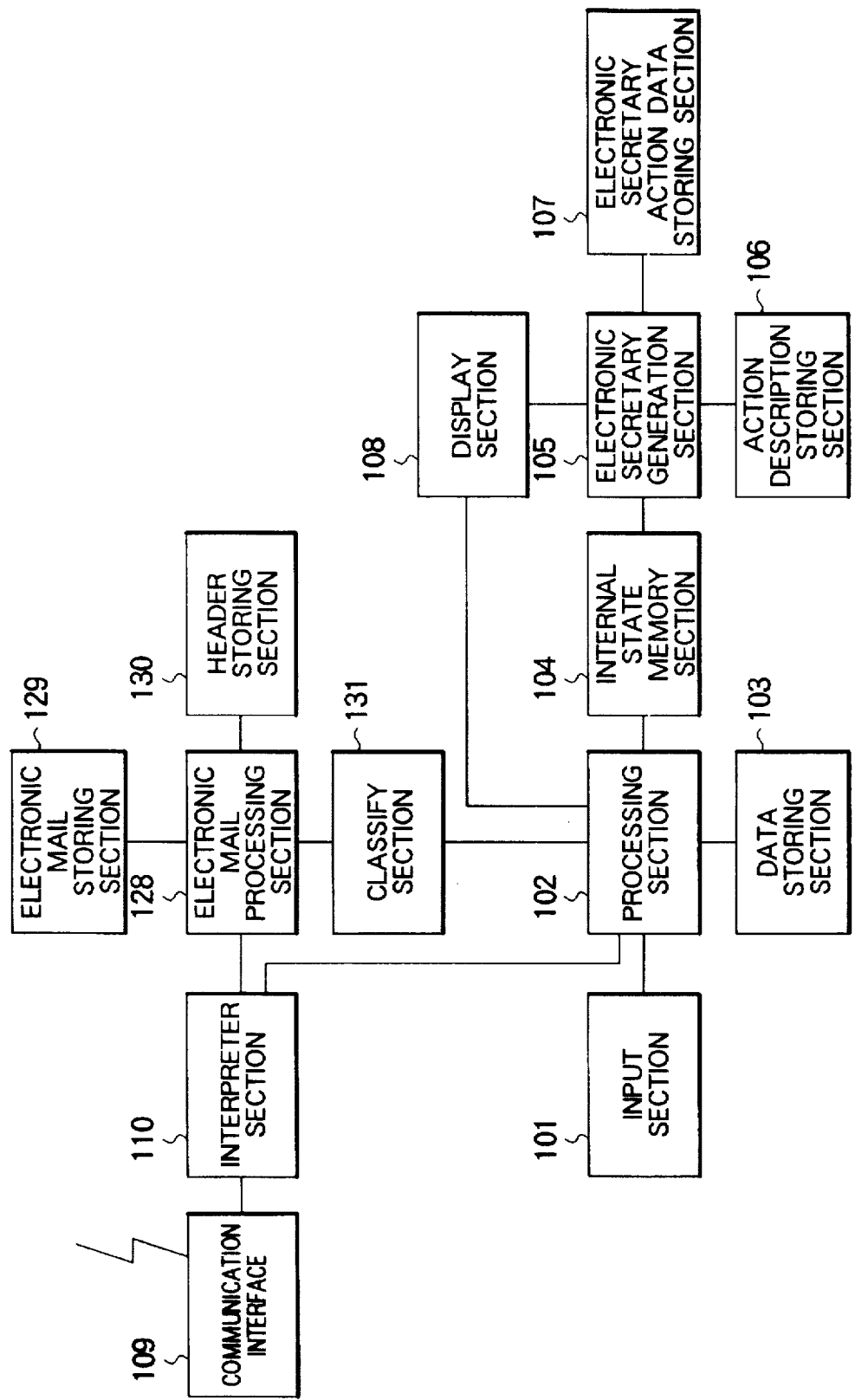

FIG. 35

| INTERNAL STATE | ELECTRONIC SECRETARY ACTION |
|---|---|
| CLASSIFY START | REPRODUCE : " CLASSIFY". |
| DURING CLASSIFYING | ACTION OF CLASSIFYING THE " HEADER" BUTTONS. |
| CLASSIFY END | FINISH THE " DURING CLASSIFYING" ACTION. |
| MAIL START | OPEN A MAIL SCREEN AND DISPLAY THE LIST OF HEADER INFORMATION. |
| MAIL ARRIVAL | ACTION OF RECEIVING A POSTAL CARD. |
| MAIL UNPROCESSED | DISPLAY A POSTRAL CARD ON THE DESK. |
| MAIL REPRODUCING | REPRODUCE DATA, SUCH AS IMAGES/VOICES INCLUDED IN AN ELECTRONIC MAIL LETTER. |
| MAIL END | CLOSE A MAIL SCREEN. |
| CLASSIFY MODE SETTING | DISPLAY A SCREEN OF CLASSIFY MODE SETTING. |
| MODE SETTING END | CLOSE A SCREEN OF CLASSIFY MODE SETTING. |

Report on official tour abroad: Aug. 18, 1993: T. Hashimoto

Object: Through an event of CG, visit to SIGGRAPH and visit to Silicon Graphics, maker of graphics workstations, to perform a research for the trends of virtual reality.

Interval: Aug. 1 - 8, 1993

Outline:

The greatest topic for this time in SIGGRAPH was the newest multi-workstation of Silicon Graphics. It is a graphics workstation, normally loaded with a TV conference function, priced as low as a million yen, and having Unix employed as OS.

The second topic was a virtual reality. A demonstration of CG capable of being rounded for inspection was being held by Silicon Graphics as well as Kaiser, Evans and Satherland, Division, Sense 8, Polhemus, MuliGen, and other many makers.

As a display, boom mount type displays were mostly used, but Silicon Graphics, Kaiser, Division, and Polhemus used their original head-mount type displays.

My general impression of virtual reality is firstly that the image quality is improved by leaps and bounds. The appearance of a new graphics engine, Reality Engine, of Silicon Graphics is said to greatly contribute to this. Secondly, in contrast to a good image quality, a depicted world contradicts the physical laws of a real world in plenty of points, and not a few elements seemed deficient in a spirit of services as entertainments.

I felt many problems yet remain to be solved on a method for interacting with a virtual world, called interactivity, and a method for describing the physical laws of a virtual world. Would you please see the photographed scenes of event sites.

(b)

| Transmitter | Date | Content |
|---|---|---|
| ☐ Hashimoto | 9/22 | Official SIGGRAPH tour |

FIG. 40

|   | CATEGORY |
|---|---|
| 1 | VR RELATED |
| 2 | NEURO RELATED |
| 3 | OTHERS |

FIG. 41A

| CATEGORY | 1 | 2 | 3 |
|---|---|---|---|
| SIMILARITY | 66 | 27 | 50 |

| | | | SCORE |
|---|---|---|---|
| VR related | | | |
| ☐ Hashimoto | 9/22 | Official SIGGRAPH tour | 66 |
| ☐ Hiide | 9/22 | Research inst. visit | 72 |
| ☐ Aramaki | 9/23 | Exhibition report | 82 |
| Neuro related | | | |
| ☐ Matsuoka | 9/21 | Chaos engineering | 82 |
| ☐ Sakamoto | 9/21 | SYNAPS | 56 |
| ☐ Inoue | 9/23 | Neuro lecture in turn | 85 |
| Others | | | |
| ☐ Tomita | 9/21 | TDL | 69 |

FIG. 41D

SCORE

VR related
- Aramaki 9/23 Exhibition report — 82
- Hiide 9/22 Research inst. visit — 72
- Hashimoto 9/22 Official SIGGRAPH tour — 66

Neuro related
- Inoue 9/23 Neuro lecture in turn — 85
- Matsuoka 9/21 Chaos engineering — 82
- Sakamoto 9/21 SYNAPS — 56

Others
- Tomita 9/21 TDL — 69

FIG. 50

|  | CLASSIFY MODE |
|---|---|
| 1 | BY CONTENT |
| 2 | BY TRANSMITTER |
| 3 | BY GROUP |
| 4 | BY DATE |
| ⋮ | ⋮ |
| OTHERS | USER SETTING |

FIG. 51

| MODE | EVALUATION FUNCTION |
|---|---|
| 1 | CALUCULATE A SIMILARITY BETWEEN THE COMPONENT VECTOR OF A SENTENCE AND A REFERENCE VECTOR. |
| 2 | SET A SIMILARITY TO 1 FOR ELECTRONIC MAIL LETTERS OF THE SAME TRANSMITTER, AND TO 0 FOR THOSE OF DIFFERENT TRANSMITTERS. |
| 3 | SET A SIMILARITY TO 1 FOR THOSE OF THE SAME GROUP, AND TO 0 FOR THOSE OF OTHERS. |
| 4 | SET A SIMILARITY TO 1 FOR THOSE OF THE SAME DATE AND TO 0 FOR THOSE OF OTHERS. |
| ⋮ | ⋮ |

ELECTRONIC SECRETARY SYSTEM WITH ANIMATED SECRETARY CHARACTER

BACKGROUND OF THE INVENTION

1. Field of the Invention

The present invention refers to an electronic secretary system and more particularly, to an electronic secretary system for performing a series of processing through an interaction between a user and a electronic secretary in an application operating on a plurality of equipment connected through a communication network.

2. Description of the Related Art

Formerly, there are some applications, such as computation and word processor, with which a person image or other images is displayed and a voice is generated to improve a man-machine interface.

As an improvement in man-machine interface by using an autonomously acting agent, there is a virtual living being system disclosed in Japanese Patent Laid-Open Publication No. 68063/1994. This stores a knowledge needed for a virtual living being in autonomously acting into a knowledge database, while a virtual living being simulates an action based on the knowledge stored in the knowledge database and the internal state of a virtual living being stored in the internal state memory means, and sends out the results to a drawing system, voice system, or the like.

Systems for performing an application by using a plurality of equipment connected through a network include, e.g., a schedule management system described in Japanese Patent Laid-Open Publication No. 6378/1993, but this invention refers to the internal mechanism and describes nothing about a human interface..

When making an information processing equipment perform a series of processing, especially when manipulating an application operating in a plurality of equipment through a communication network, a conventional system has been hardly manageable because what processing is performed inside becomes difficult for a user to understand.

To solve these problems, the present invention provides an electronic secretary system that can achieve an improvement in man-machine interface by display the contents of processing or internal state to a user in an easily understandable form through an action of an electronic secretary imitating a person to operate various processing.

SUMMARY OF THE INVENTION

According to an aspect of the present invention, there is provided an electronic secretary system for performing a series of processing through an interaction between a user and an electronic secretary displayed as an object imitating a human action, comprising: input means for inputting information, such as user's instruction; processing means responsive to the input information for performing a predetermined processing; data storing means for storing data to be processed; internal state memory means for memorizing the internal state of processing; first action description storing means for storing the action of said electronic secretary described corresponding to the state of said processing; first electronic secretary generation means for generating actions of said electronic secretary from the state of processing memorized in said internal state memory means and the description stored in response to the state of processing into said action description storing means; and display means for performing an action of said electronic secretary and a display of data.

According to an aspect of the present invention, there is provided an electronic secretary system further comprising: means for communicating with other one or more electronic secretary systems; second action description storing means for storing data describing the action of another electronic secretary in a communication partner; and second electronic secretary generation means for generating an action of said another electronic secretary in the communication partner.

According to an aspect of the present invention, there is provided an electronic secretary system further comprising: mode memory means for memorizing the user's work environment.

According to an aspect of the present invention, there is provided an electronic secretary system further comprising: internal state generation means for generating the internal state in accordance with a predetermined rule.

According to an aspect of the present invention, there is provided an electronic secretary system comprising: retrieval means for retrieving data corresponding to the retrieval condition inputted by a user from the electronic secretary system of said user himself or other electronic secretary systems connected through a communication means instead of said processing means.

According to an aspect of the present invention, there is provided an electronic secretary system wherein said processing means performs the registration, deletion or retrieval of a schedule in the electronic secretary system of said user himself or other electronic secretary systems connected through a communication means.

According to an aspect of the present invention, there is provided an electronic secretary system further comprising: history memory means for memorizing the history of the internal state; wherein in response to request from a user, what action the electronic secretary has made is displayed on said display means by referring to the history memorized on said history memory means.

According to an aspect of the present invention, there is provided an electronic secretary system further comprising: communicator means for communicating with other one or more electronic secretary systems; electronic mail processing means for processing electronic mail letters transferred through said communicator means; and classifying means for classifying the electronic mail processed by said electric mail means.

According to an aspect of the present invention, there is provided an electronic secretary system further comprising: classifying mode memory means for memorizing a classifying mode by referring to the instruction inputted from said input means.

According to the electronic secretary system of the present invention, since it is so arranged that first action description storing means stores the action description of an electronic secretary displayed as an object imitating a human action, an instruction or the like is inputted by input means, a predetermined processing is performed in response to input information by processing means, the state of processing is memorized by internal state memory means, and an action of the electronic secretary corresponding to the internal state is determined out of the action description, and generated by first generation means, and outputted to the display means, a user can get the electronic secretary system execute a series of processing through an interaction with the electronic secretary, thereby enabling an improvement in man-machine interface.

According to the electronic secretary system of the present invention, since it is so arranged that second action description storing means stores data describing the actions of electronic secretaries in one or more communication partners and second generation means generates an action of each partner electronic secretary, an action of the partner electronic secretary is displayed, thereby enabling a user to identify the internal state of communication partners.

According to the electronic secretary system of the present invention, since it is so arranged that mode memory means memorizes the user's work environment and data stored in electronic secretary action data storing means are switched by electronic secretary generation means in response to a setting value stored in said mode memory means, an output is obtained which corresponds to the work environment or the user's setting.

According to the electronic secretary system of the present invention, since it is so arranged that the internal state is generated by internal state generation means in accordance with a predetermined rule and written into the internal state memory means and that an action of the electronic secretary corresponding to the internal state is generated by electronic secretary generation means, actions, such as wink, of the electronic secretary can be actualized and an autonomous action becomes possible.

According to the electronic secretary system of the present invention, since it is so arranged that data corresponding to the retrieval condition inputted by a user are retrieved by retrieval means from the data storing means distributed in a plurality of equipment connected through a communication means, notice can be given to a user that the system is engaged in retrieval by an electronic secretary exhibiting the process of performed retrieval to a user.

According to the electronic secretary system of the present invention, since it is so arranged that the registration, deletion or retrieval of schedule is performed by said processing means and the registration, reference or the like of schedule data is performed through communication means notice can be given using an electronic secretary to a user of the actual state of the registration, deletion or retrieval of schedule .

According to the electronic secretary system of the present invention, since it is so arranged that with the history of the internal state memorized in the history memory means, what action has been made in the past by an electronic secretary is displayed on the display means by request of a user, a user can regenerate a motion of the electronic secretary and thus can identifies what action has been made by the electronic secretary.

According to the electronic secretary system of the present invention, since it is so arranged that data are transferred by communicator means with other equipment connected through a network and that the electronic mail letter transferred is processed by electronic mail processing means, data of the electronic mail processing means and an action of the electronic secretary are displayed on display means and electronic mail letters are classified by classifying means when data comprising electronic mail, a great many electronic mail letters can be classified by a user's desired setting even if arriving through a communication network, enabling the ease of using an application to be improved.

According to the electronic secretary system of the present invention, since it is so arranged that a classify mode based on the instruction inputted from said input means is memorized by classify mode memory means, a user can easily set the classify mode at any time.

Further objects and advantages of the present invention will be apparent from the following description of the preferred embodiment of the invention as illustrated in the accompanying drawings.

BRIEF DESCRIPTION OF THE DRAWINGS

FIG. 2 is a data list showing the electronic-secretary's actions corresponding to various internal states.

FIG. 33 is to illustrate a practical display image of an electronic secretary system according to the present invention.

FIG. 34 is a block diagram showing an eighth embodiment of an electronic secretary system according to the present invention.

FIG. 35 is a data list showing the electronic-secretary's actions corresponding to various internal states.

FIG. 39 is to illustrate an electronic mail letter.

FIG. 40 is to illustrate the categories for classifying.

FIG. 41a is to illustrate a similarity for each category.

FIG. 41b is to illustrate the extracted result of similarity.

FIG. 41c is to illustrate displaying examples of headers of electronic mail letters.

FIG. 41d is to illustrate displaying examples of headers of electronic mail letters.

FIG. 50 is to illustrate various classify modes.

FIG. 51 is to illustrate estimation functions corresponding to individual classify modes.

DESCRIPTION OF THE PREFERRED EMBODIMENT

Figure 1:
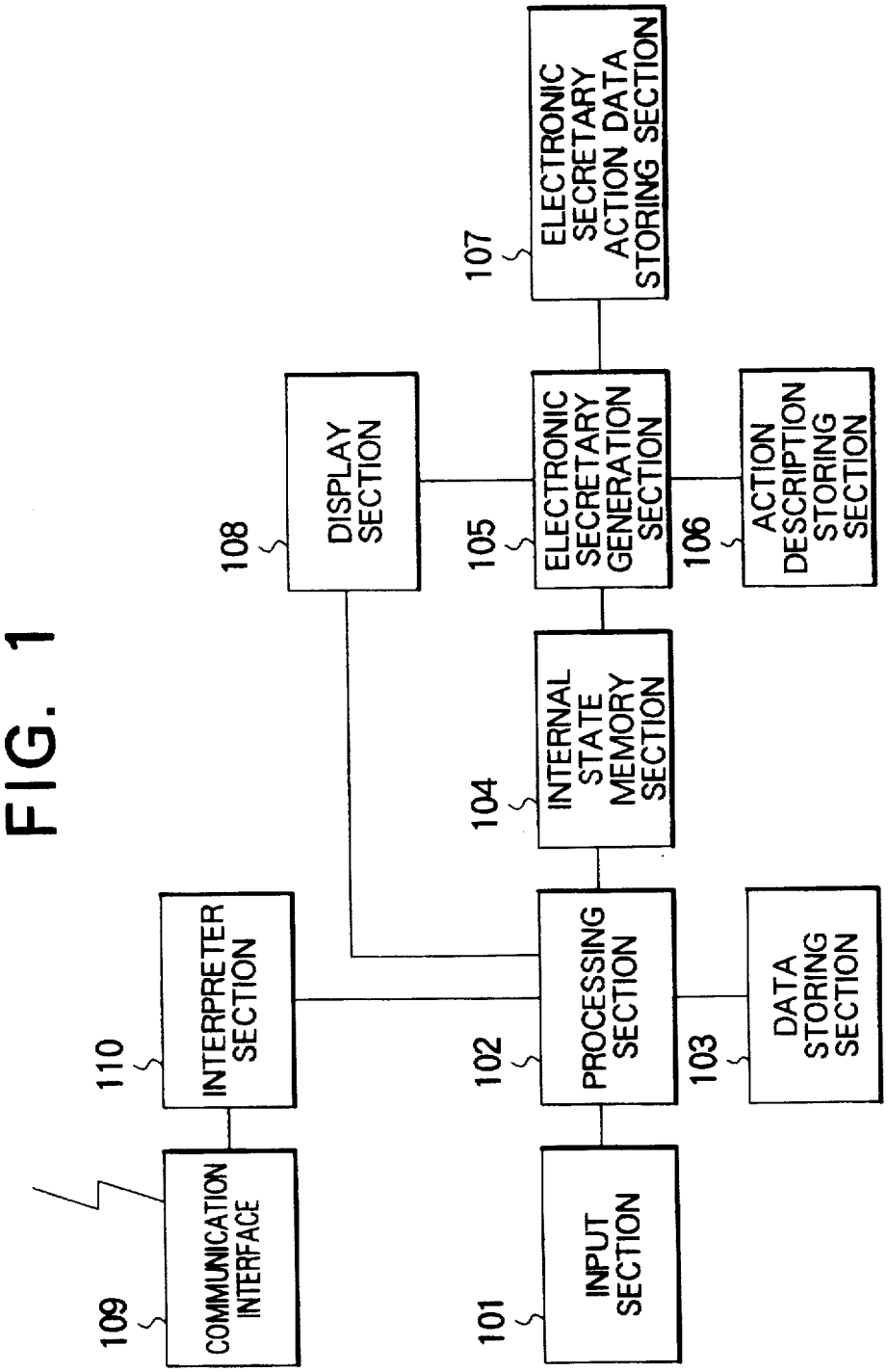
FIG. 1 is a block diagram showing a first embodiment of an electronic secretary system according to the present invention.

Hereinafter, a first embodiment of an electronic secretary system according to the present invention will be described referring to the drawings.

As shown in FIG. 1, an electronic secretary system according to the present invention comprises: an input section 101 as input means, such as mouse and keyboard, for inputting operational information; a processing section 102 as processing means responsive to the input information for performing a predetermined processing; a data storing section 103 for storing input information; an internal state memory section 104 as internal state memory means for memorizing the internal state of processing; an action description storing section 106 as first action description storing means for storing the action description of an electronic secretary as an object imitating a human action; an electronic secretary action data storing section 107 as first data storing means for storing data, such as image of an action and voice, of the electronic secretary; an electronic secretary generation section 105 as action decision means for deciding and first generation means for generating an action of an electronic secretary corresponding to the internal state out of the action description; a display section 108 for displaying an output of the processing section 102 and an output of the electronic secretary generation section 105; a communication interface 109 for performing data transfer with other equipment connected through a network; and an interpretater section 110 for interpreting data to be transferred and performing data transfer between the processing section 102 and communication interface 109.

Data describing an action of the electronic secretary stored in the action description storing section 106 corresponding to the internal state are as shown in FIG. 2, the internal state shown in FIG. 2 is actually stored together with related data added thereto. The related data include, for example, names of communication partners or contents of retrieval requests, and are auxiliary information for actions of the electronic secretary, for example, information on XX for performing an action of "There was a request from XX."

Figure 3:
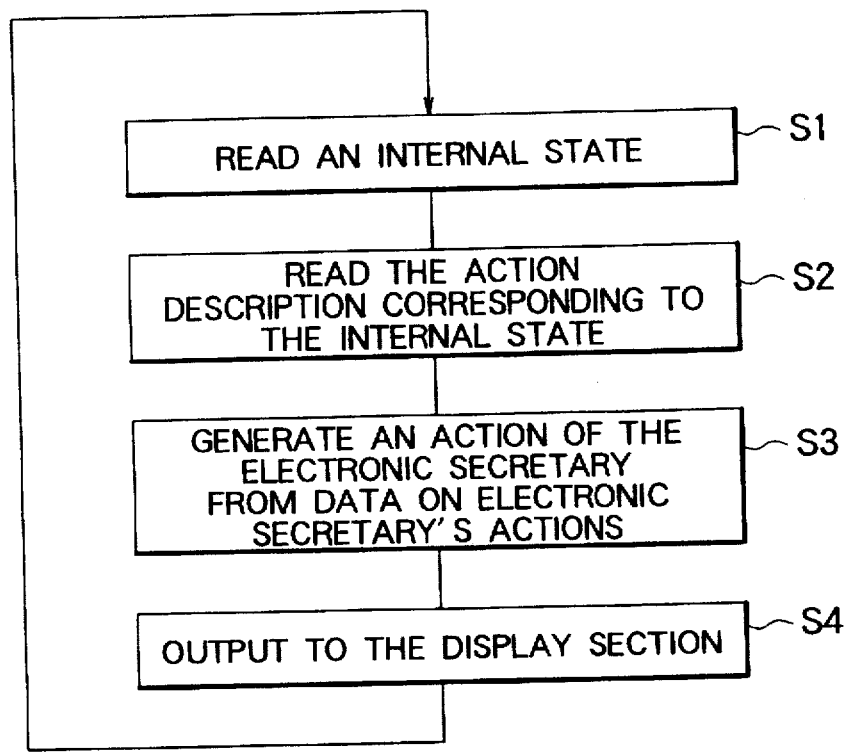
FIG. 3 is a flowchart showing operations of a first embodiment of an electronic secretary system according to the present invention.

Next, actions of the electronic secretary generation section 105 will be described along the flowchart of FIG. 3.

The internal state written in the internal state memory section 104 is read by electronic secretary generation section 105 (step S1), while the action description corresponding to the internal state is read out from data stored in the action description storing section 106 (step S2). Based on the action description read out, an action of the electronic secretary is generated (step S3), and a voice, image or the like stored in the electronic secretary action data storing section 107 is outputted to the display section 108 (step S4). These actions are repeated at each elapse of a predetermined time.

Figure 4:
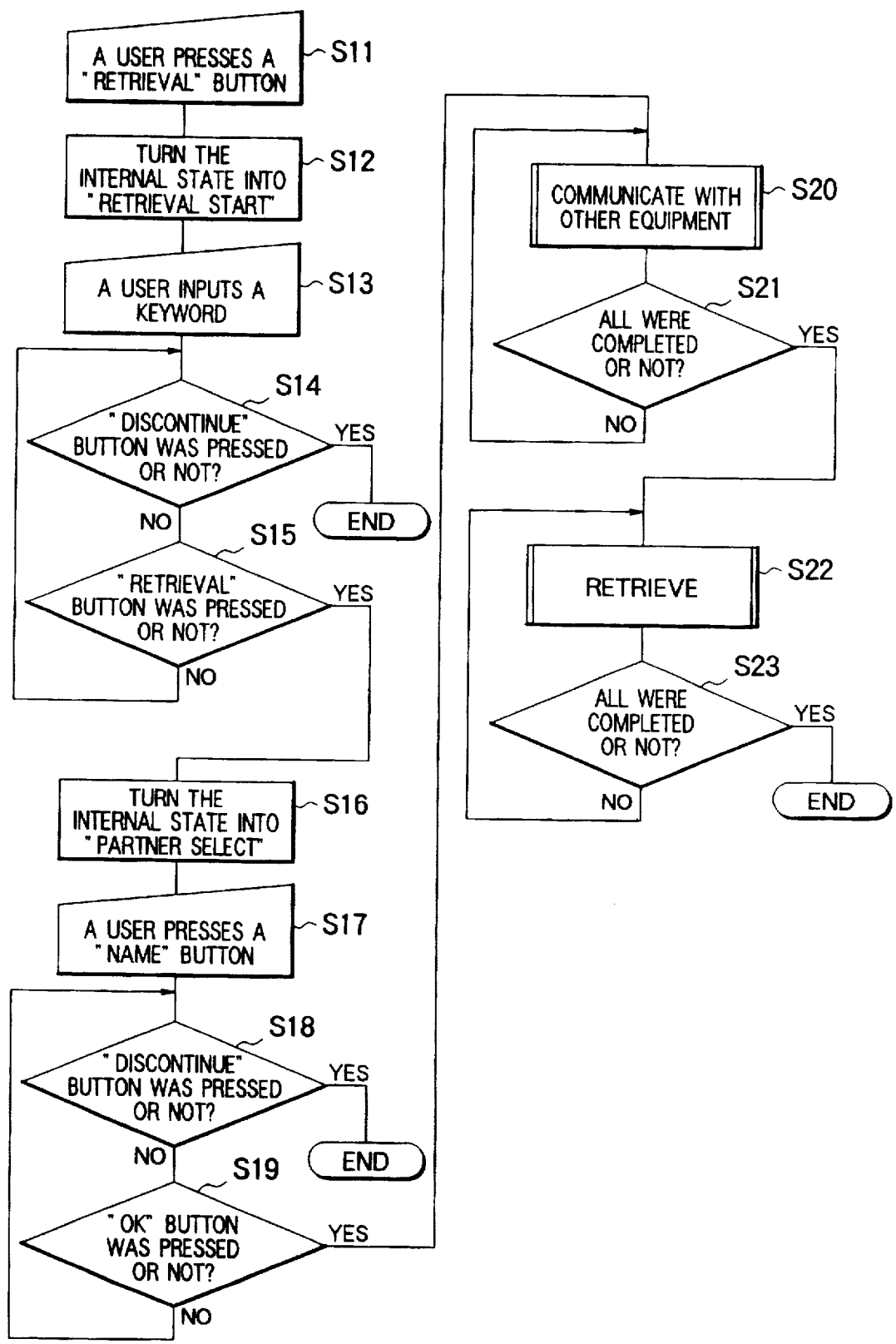
FIG. 4 is a flowchart showing operations of a first embodiment of an electronic secretary system according to the present invention.

Next, actions in the case of retrieval will be described along the flowchart of FIG. 4.

When a user selects a "Retrieval" button by using a mouse or the like (step S11), "Retrieval Start" is written in the internal state memory section 104 by the processing section 102 (step S12) and at the same time a window for keyword input is opened. When "Retrieval Start" is written in the internal state memory section 104, an action of the electronic secretary corresponding to "Retrieval Start" is read out from data of FIG. 2 stored in the action description storing section 106, and voice data "Input a keyword", stored in the electronic secretary action data storing section 107 is regenerated. At this time, the mouth of the electronic secretary moves corresponding to an output of voice data, where the movement of the mouth is implemented by an alternate display of images of closed mouse and opened mouth during voice output. From this on, similarly when a voice is outputted, the mouth of the electronic secretary moves during voice output. Incidentally, the number of internal states may be plural. For example, it can also be set that a state of retrieval start sets in while keeping a state of request receipt. This means that the system stands in an allowable state of receiving a request from a user and the electronic secretary performs an action of retrieval start.

When a user inputs a keyword by using a keyboard (step S13), the processing section 102 decides whether the "Break" button was pressed or not (step S14). If the "Break" button is pressed, the retrieval processing is broken off. If deciding that the "Break" button is not pressed, the processing section 102 decides whether the "Retrieval" button is pressed (step S15). If the "Retrieval" button is not pressed, the system returns to the step S14. And if the "Retrieval" button is pressed, "Partner Selection" is written in the internal state storing section 104 (step S16). When "Partner Selection" is written, "Whom do you ask?" is regenerated as an action of the electronic secretary from data of FIG. 2. A "Name" button of the partner to be asked for retrieval is selected using a mouse or the like by a user (step S17). A mark is placed on the people selected and it is decided whether the "Break" button is pressed or not (step S18). If the "Break" button is pressed, the retrieval processing is broken off. Or, if the "Break" button is not pressed, it is decided whether the "OK" button is pressed (step S19). If the "OK" button is not pressed, the system returns to the step S18. Or, if the "OK" button is pressed, a communication with other equipment starts (step S20).

Then, when the transmit processing of requests for all selected communication partners ends (step S21), the processing of retrieval starts (step S22). Retrieval can be executed, for example, by a method for extracting a sentence in which any of keywords of sentence data stored in the data storing section 103 and a keyword inputted by a user is coincident or similar. During retrieval, "During Retrieval" is written into the internal state storing section 104. When the internal state is "During Retrieval", an action of leafing through a book is performed as an electronic secretary's action from data of FIG. 2. This processing is performed for all data till the retrieval is completed (step S23).

Here, the contents of communication with other equipment will be described in detail.

Figure 5:
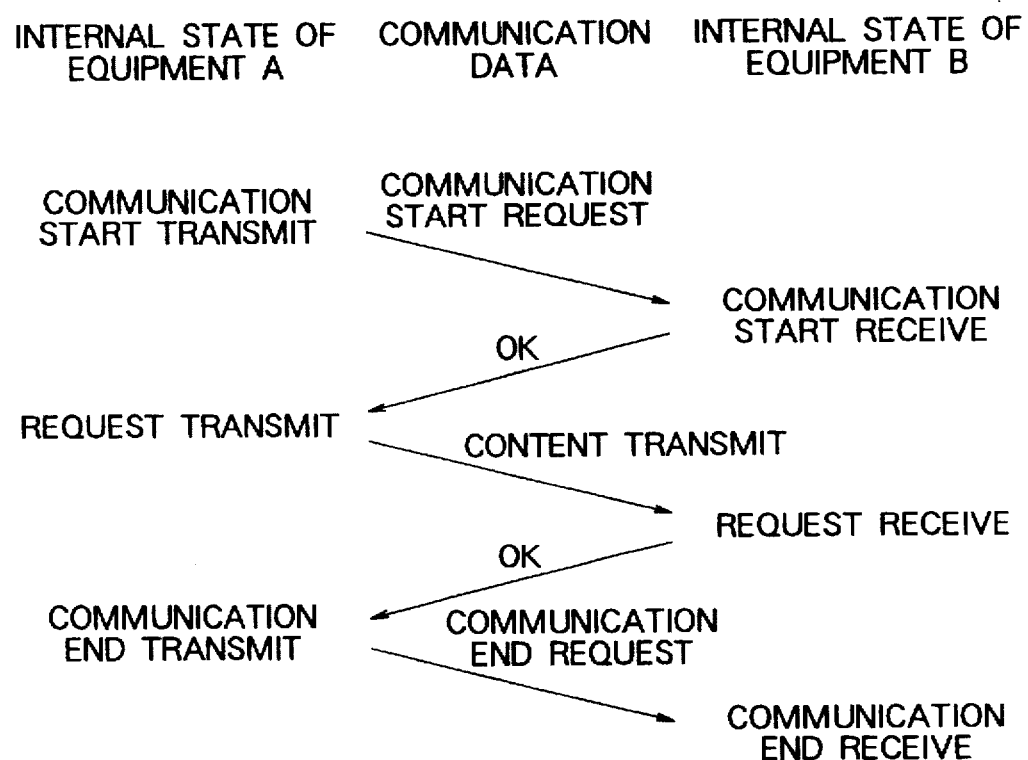
FIG. 5 is a progress chart showing operations of a first embodiment of an electronic secretary system according to the present invention.

By way of example, a communication between Equipment A (user's name: Ueda) and Equipment B (user's name: Sakamoto) will be described. The contents of communication is outputted from the processing section 102 of Equipment A to the interpreter section 110. The information of a communication partner and that of the contents of communication are converted into communication codes by the interpreter section 110 and outputted to the communication interface 109. Actual transfer of data is performed by the communication interface 109. As shown in FIG. 5, the internal state in Equipment A and Equipment B, an action of the electronic secretary, and transmit data are provided. First, a request for communication start from Equipment A to Equipment B is transmitted. At this time, the internal state becomes "Communication Start Transmit", the electronic secretary performs an action of telephoning in accordance with FIG. 2. In Equipment B, data of communication start request are received from Equipment A, the internal state becomes "Communication Start Receive", and data of "OK" is transmitted as a reply. At this time, the electronic secretary of Equipment B performs an action of receiving a telephone and a voice of "Hello, this is (Sakamoto's) secretary speaking," is regenerated. Incidentally, the name in a bracket is a user's name set for each equipment and differs with equipment.

In Equipment A that has received data of OK, the internal state becomes "Request Transmit" and the contents of request is transmitted. In the case of retrieval, the contents of request comprise keyword, name of the retrieval requesting user ("Ueda" in this example), name of the retrieval result output file, and the like. The format is, for example, as follows:

Search ("Computer Kagaku", "Ueda", "kensaku.txt"), where Search means a request of retrieval.

At this time, the electronic secretary in Equipment A regenerates "This is (Ueda's) secretary speaking and there is a request from (Ueda)". The internal state of Equipment B that has received the contents of request becomes "Request Receive" and OK data is transmitted as a reply. At this time, the electronic secretary in Equipment B regenerates "I've understood and I'll tell (Sakamoto). The internal state of Equipment A that has received OK data becomes "Communication End Transmit" and a request of communication end is transmitted. The internal state of Equipment B that has received a request of communication end becomes "Communication End Receive" and the electronic secretary of Equipment B performs an action of hanging up.

After the above series of communication ends, the contents of request are executed. In this example, the retrieval is executed.

Figure 6:
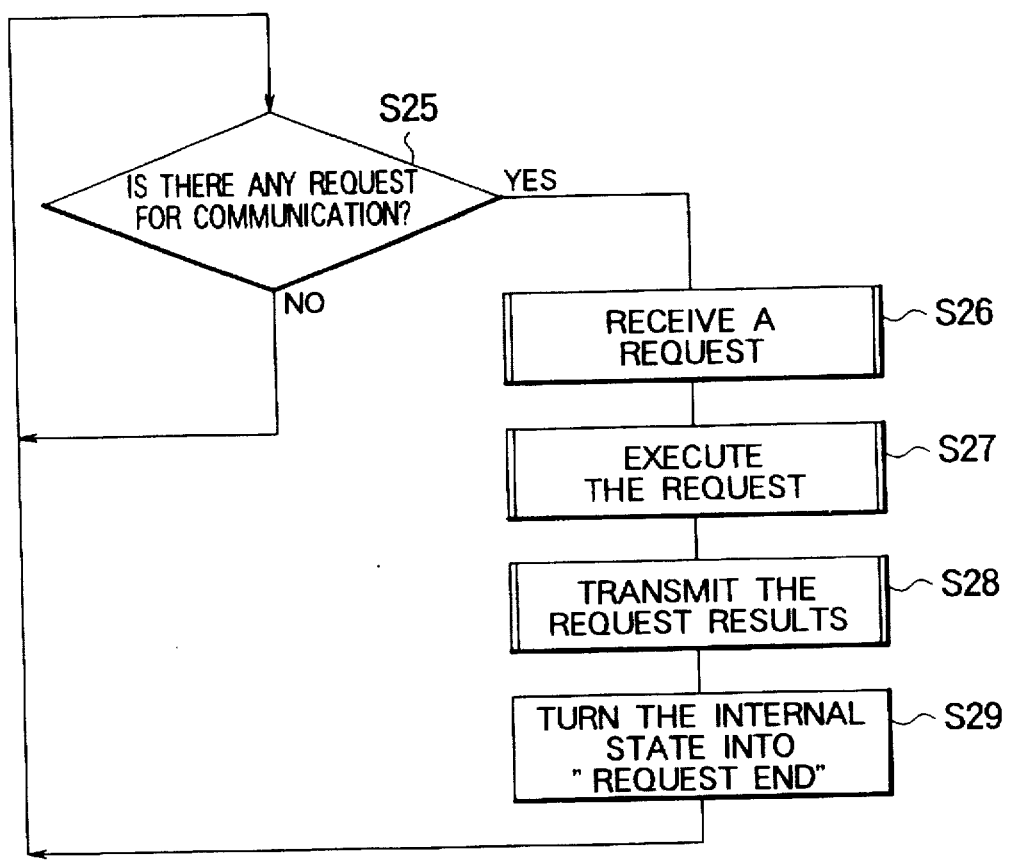
FIG. 6 is a flowchart showing operations of a first embodiment of an electronic secretary system according to the present invention.

Next, a series of actions: receiving a request through communication, then executing the request, till returning the result of the request will be described along the flowchart of FIG. 6.

Keep waiting till a request from other equipment occurs (step S25). When a request occurs, receive the request following the above procedure (step 26) and execute the request (step S27). Then, transmit the result of the request to the equipment of the user that has advanced the request (step S28). Furthermore, turn the internal state into "Request End". At this time, the electronic secretary performs an action of raising her hands from data of FIG. 2.

Figure 7:
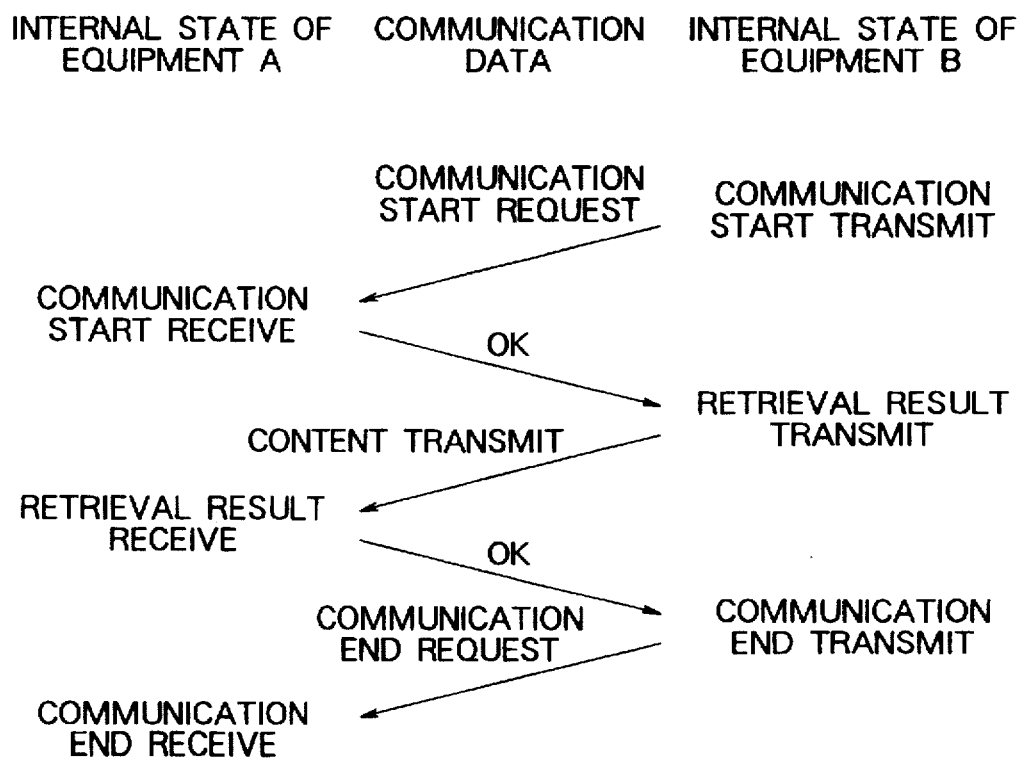
FIG. 7 is a progress chart showing operations of a first embodiment of an electronic secretary system according to the present invention.

Next, the procedure of communication concerning the reply of request result between Equipment B and Equipment A will be described using FIG. 7.

First, the internal state of Equipment B becomes "Communication Start Transmit" and a request for communication start is transmitted to Equipment A. The internal state of Equipment A that has received a request for communication start becomes "Communication Start Receive" and data of OK is transmitted as a reply. The internal state of Equipment B that has received OK data becomes "Retrieval Result Transmit". The electronic secretary of Equipment B regenerates "We'll transmit the retrieval result" and the content of request result is transmitted. The transmitted content contains the header part and text of retrieved sentences, similarity of each sentence and the keyword, name of transmitting user, and the like. The internal state of Equipment A that has received the retrieval result becomes "Retrieval Result Receive" and data of OK is transmitted as a reply. At this time, the electronic secretary of Equipment A regenerates "We're obliged." Next, the internal state of Equipment B that has received OK data becomes "Communication End Transmit" and a request of communication end is transmitted. The request of communication end is received by Equipment A and the internal state becomes "Communication End Receive".

Figure 8:
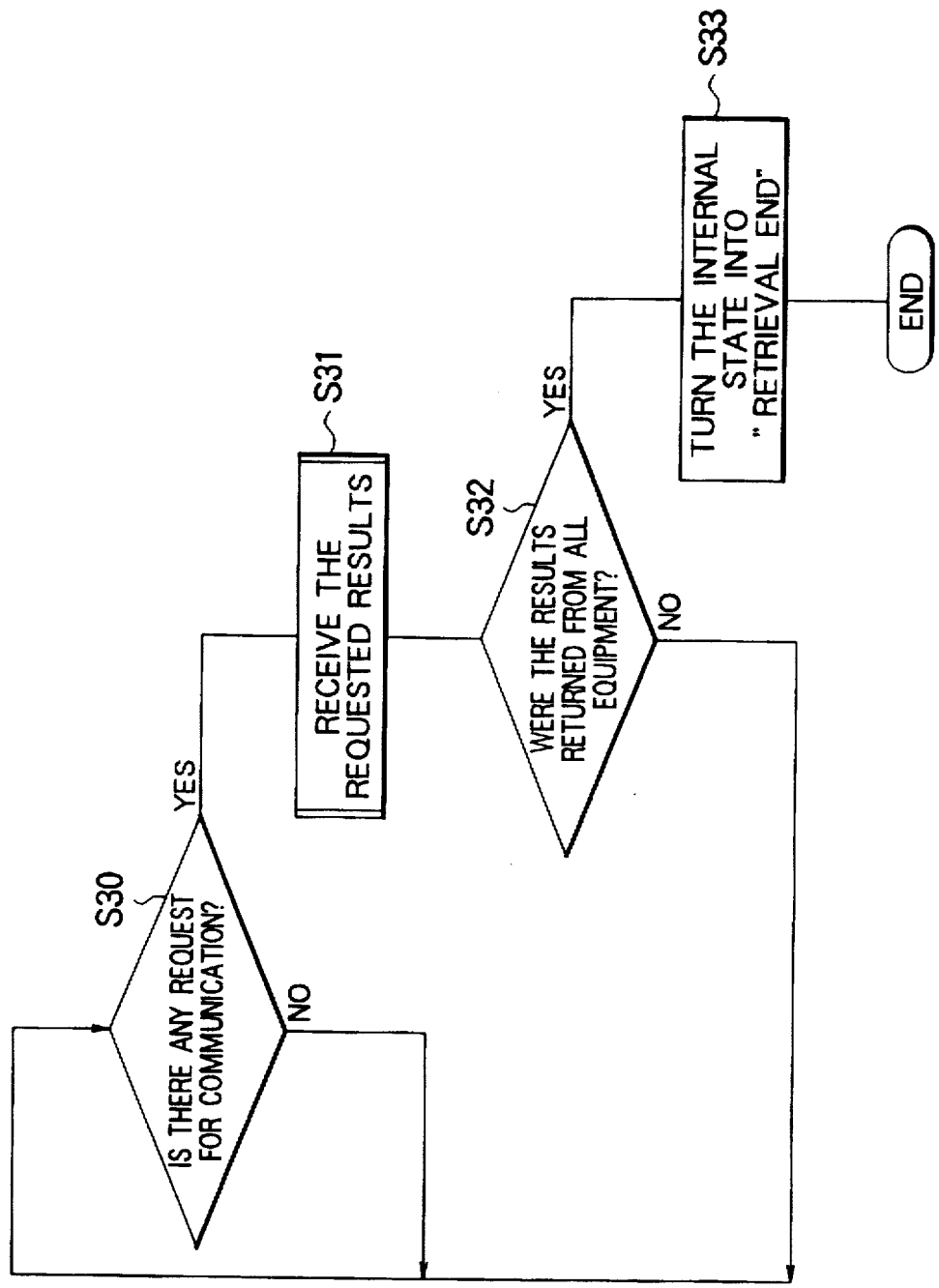
FIG. 8 is a flowchart showing operations of a first embodiment of an electronic secretary system according to the present invention.

Next, the processing procedure of equipment when transmitting the requirements of a request and waiting the request result will be described along the flowchart of FIG. 8.

Keep waiting till a request of communication occurs (step S30). When a request of communication occurs, receive the request result as mentioned above (step S31). And, repeat the above processing till the request results return from all equipment to which the request are transmitted (step S32). When the results are transmitted from all equipment, the internal state becomes "Retrieval End" (step S33).

Next, a second embodiment of an electronic secretary system according to the present invention will be described referring to the drawings.

Figure 9:
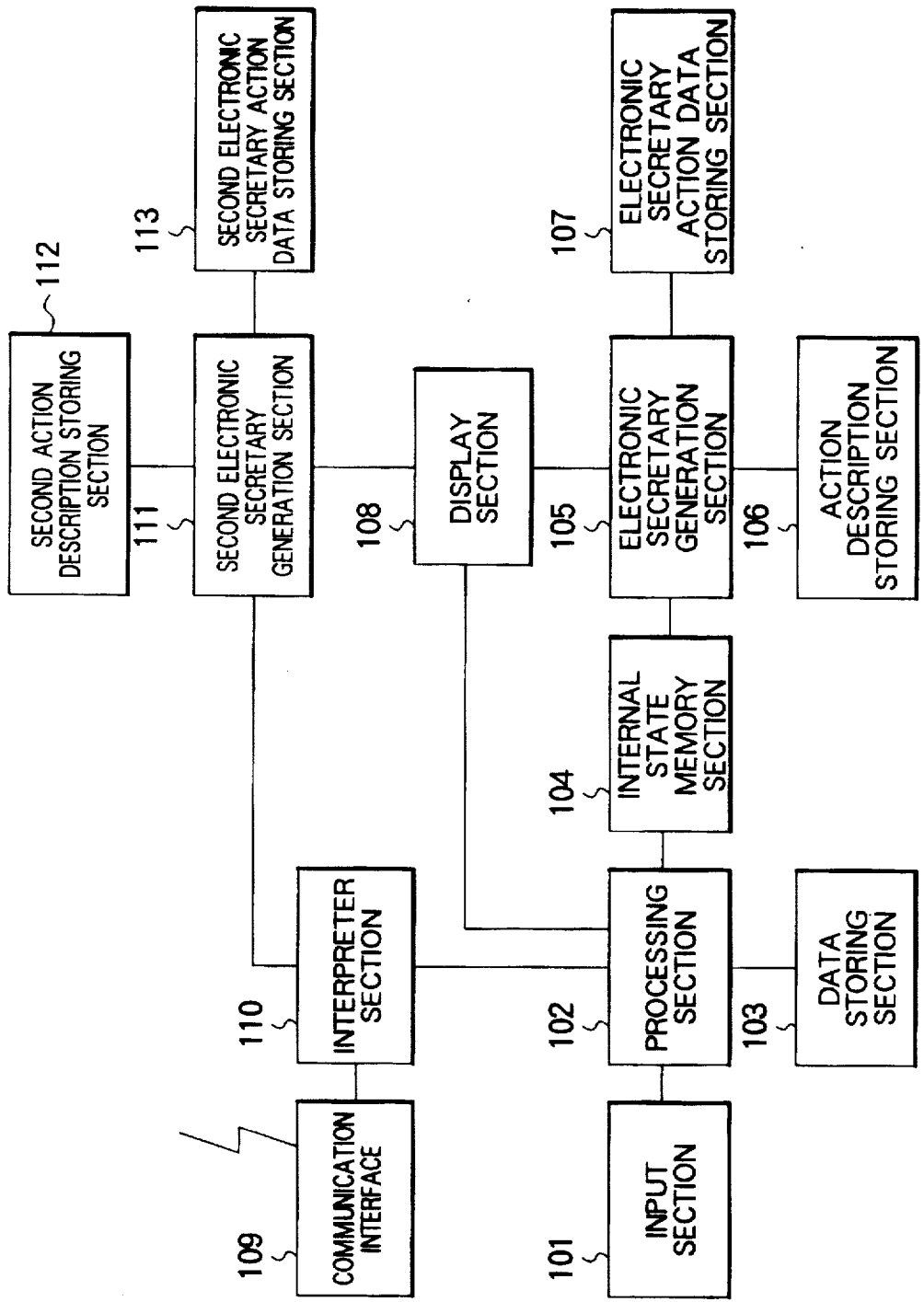
FIG. 9 is a block diagram showing a second embodiment of an electronic secretary system according to the present invention.

As shown in FIG. 9, an electronic secretary system according to the present invention comprises: an input section 101, such as mouse and keyboard, for inputting operational information; a processing section 102 responsive to the input information for performing a predetermined processing; a data storing section 103 for storing input information; an internal state memory section 104 for memorizing the internal state of processing; an action description storing section 106 for storing the action description of an electronic secretary as an object imitating a human action; an electronic secretary action data storing section 107 for storing data, such as image of an action and voice, of the electronic secretary; an electronic secretary generation section 105 for deciding and generating an action of the electronic secretary corresponding to the internal state out of the action description; a display section 108 for displaying an output of the processing section 102 and an output of the electronic secretary generation section 105; a communication interface 109 for performing data transfer with other equipment connected through a network; an interpreter section 110 for interpreting data to be transferred and performing data transfer between the processing section 102 and communication interface 109; a second action description storing section 112 as second action description storing means for storing data describing the action of the electronic secretary in one or more communication partners; a second electronic secretary action data storing section 113 as second data storing means for storing data, such as image of an action and voice, of the electronic secretary; and a second electronic secretary generation section 111 as second generation means for generating an action of the electronic secretary.

Next, actions during communication will be described.

As shown in FIG. 5, when advancing a request from Equipment A to Equipment B, the internal state of Equipment A becomes "Communication Start Transmit" and a request of communication start is transmitted to Equipment B. At this time, not only a request of communication start but also the user's name and internal state of Equipment A on the transmitter side are transmitted. In the interpreter section 110 of Equipment B on the receiver side, a request of communication start is outputted to the processing section 102 and the user's name and internal state, information related to the electronic secretary of Equipment A is outputted to the second electronic secretary generation section 111. In the second electronic secretary generation section 111, the action description of an electronic secretary corresponding to the internal state and data on an action of the electronic secretary responsive to the user's name are read from the second action description storing section 112 and second electronic secretary action data storing section 113 respectively, and actions of the electronic secretary are generated.

Here, with respect to data on a second action description and second electronic secretary action data, it is considered that at the start of communication data are previously prepared for a plurality of communication partners, action describing data and second electronic secretary action data are selected responsive to a communication partner, and an action of another electronic secretary is generated, or that at the start of communication, data on a second action description and second electronic secretary action data are transmitted and stored in a second action description storing section 112 and second electronic secretary action data storing section 113 at the destination, respectively.

Next, the above-mentioned example of actions will be described referring to an actual display screen.

Figure 10:
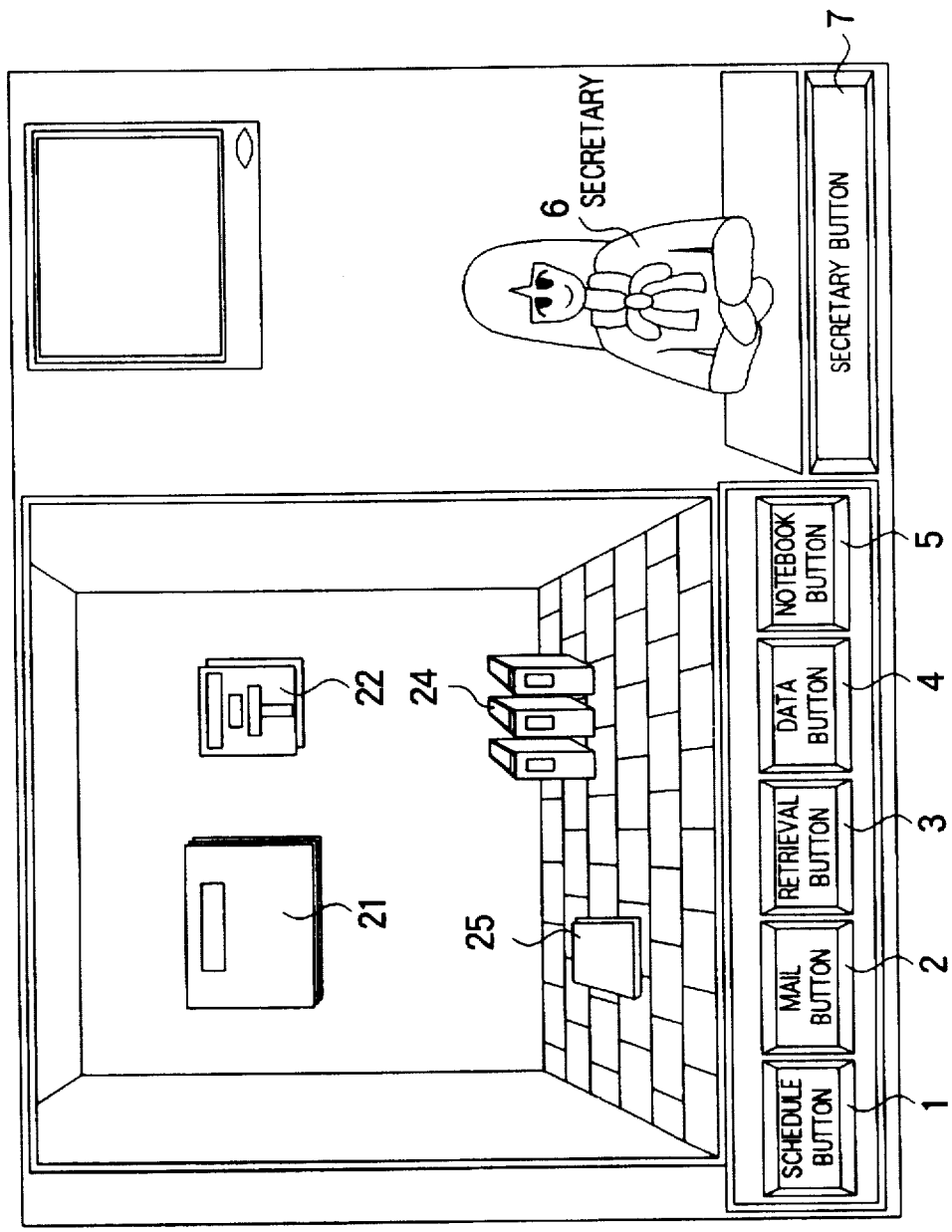
FIG. 10 is to illustrate a practical display image of an electronic secretary system according to the present invention.
Figure 11:
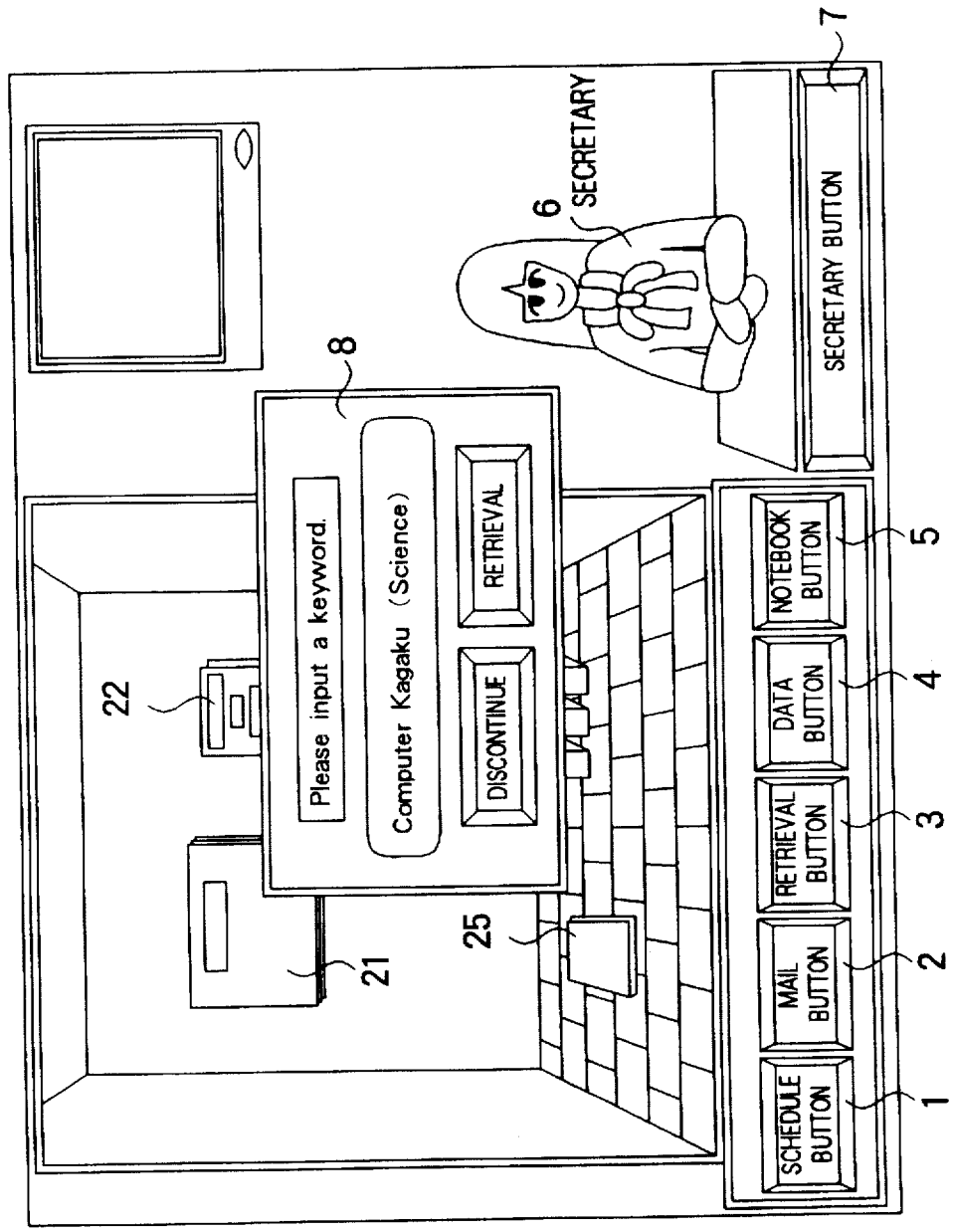
FIG. 11 is to illustrate a practical display image of an electronic secretary system according to the present invention.
Figure 12:
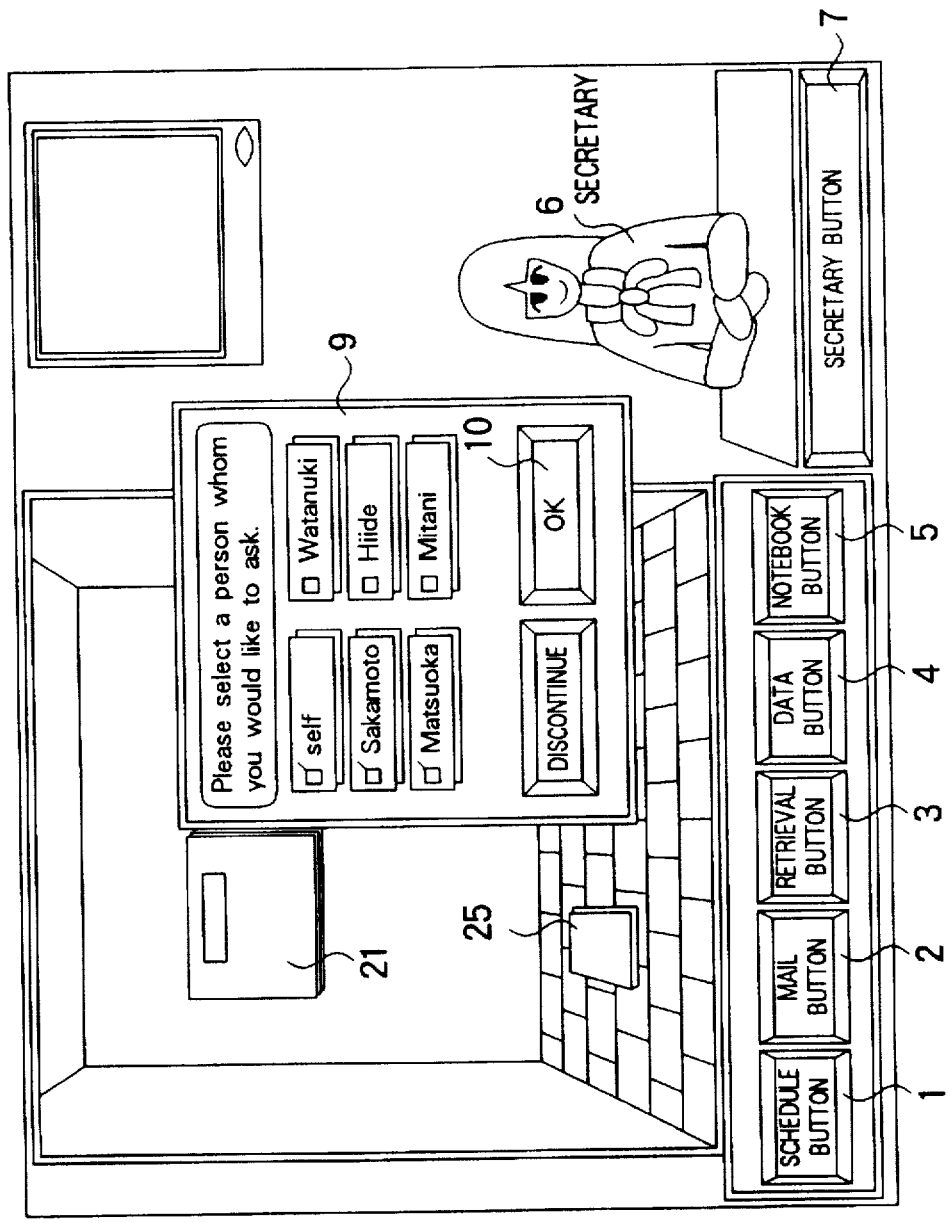
FIG. 12 is to illustrate a practical display image of an electronic secretary system according to the present invention.
Figure 13:
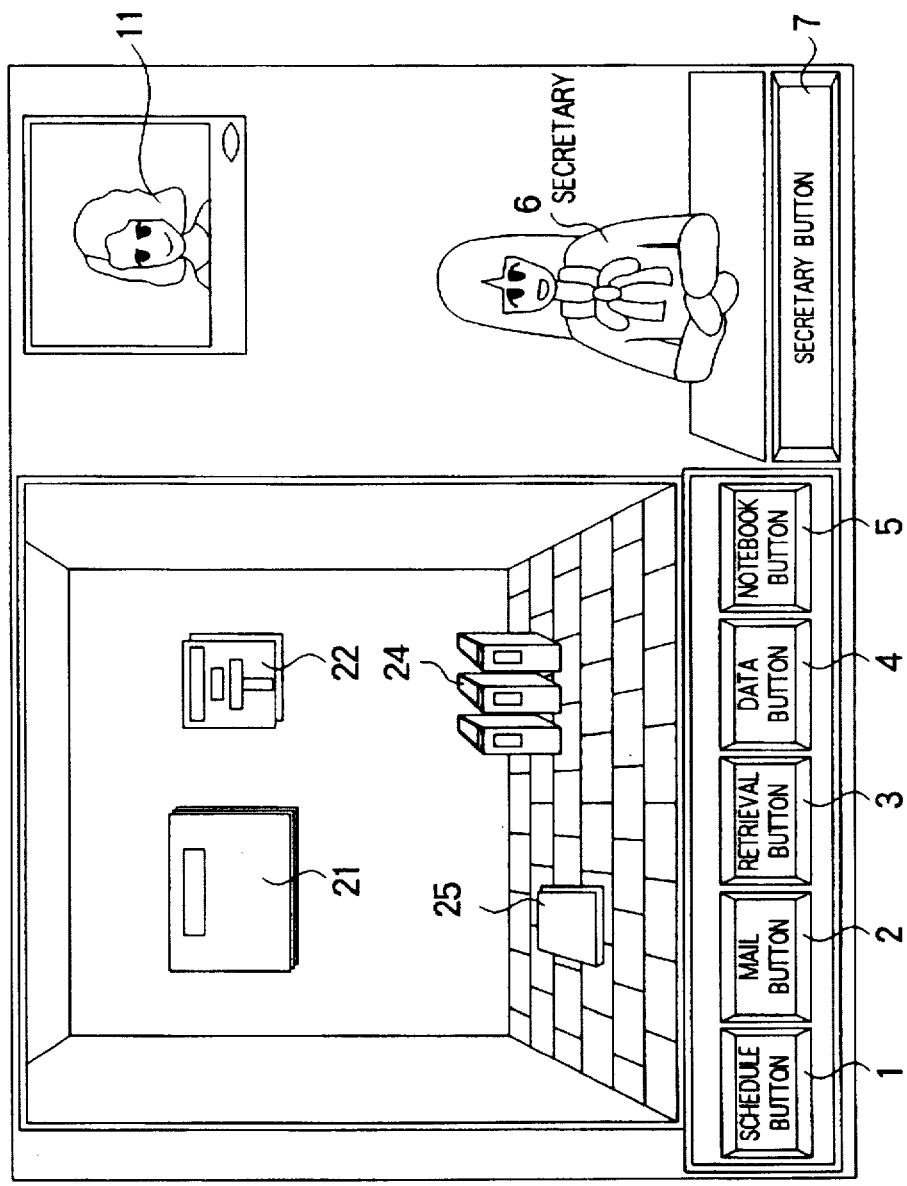
FIG. 13 is to illustrate a practical display image of an electronic secretary system according to the present invention.
Figure 14:
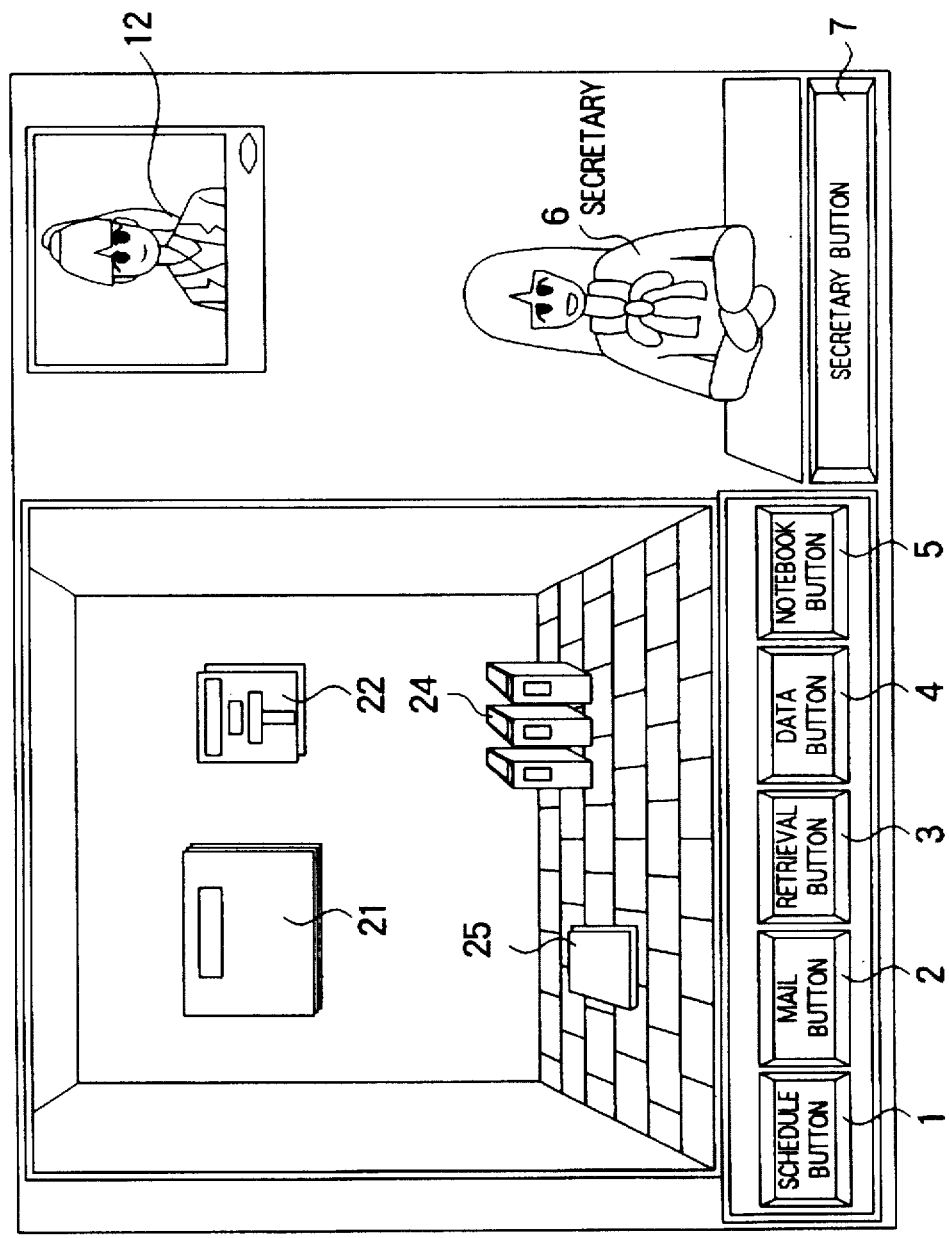
FIG. 14 is to illustrate a practical display image of an electronic secretary system according to the present invention.

As shown in FIG. 10, the initial screen of the display displays a schedule button 1, mail button 2, retrieval button 3, data button 4 and note button 5 which correspond to individual processing at the lower left, and an electronic secretary 6 and secretary button 7 on the right. In the middle of the screen, there are a button 21 materializing a calendar, a button 22 materializing a mailbox, a button 24 materializing a data file, and a button 25 materializing a notebook, which perform the respective processing similar to that of the schedule button 1, mail button 2, data button 4 and note button 5. Here, when pressing the retrieval button 3, a window 8 for keyword input as shown in FIG. 11 comes to appear and a user inputs a keyword from the keyboard and the like. Here, when pressing the retrieval button in the window 8, a window 9 for displaying the names of those whose request is asked comes to appear as shown in FIG. 12. Then, when pressing a name button, a mark for indicating a selection of the relevant person is put on the name button pressed. In the illustrated example, "Self", "Sakamoto" and "Matsuoka" are selected. Then, when pressing the OK button 10, a communication with those selected above starts. FIG. 13 shows an example of a communication with the electronic secretary 11 of "Sakamoto". An action of the electronic secretary of another equipment is displayed on the upper right screen. FIG. 14 shows an example of a communication with the electronic secretary 12 of "Matsuoka".

Figure 15:
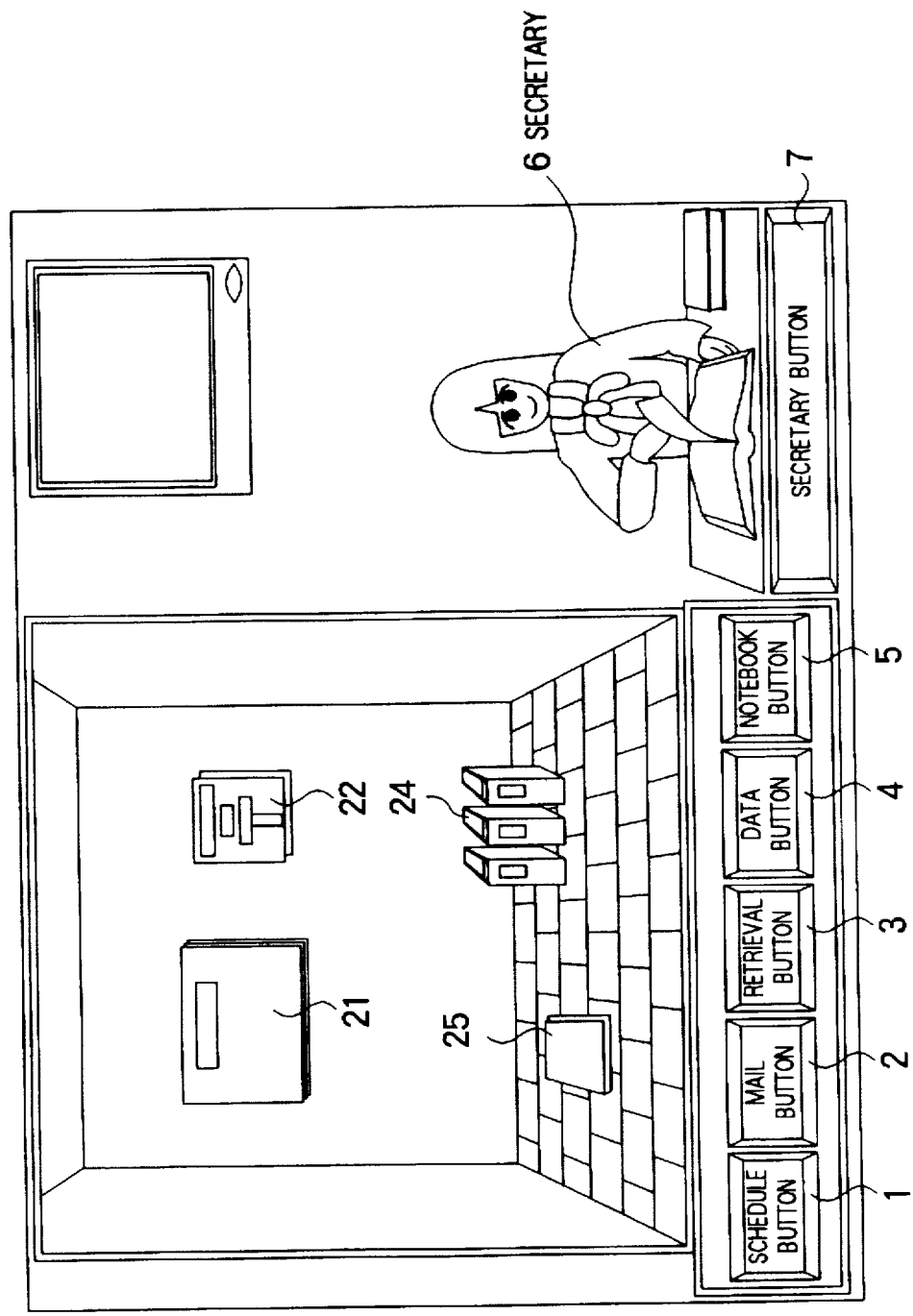
FIG. 15 is to illustrate a practical display image of an electronic secretary system according to the present invention.
Figure 16:
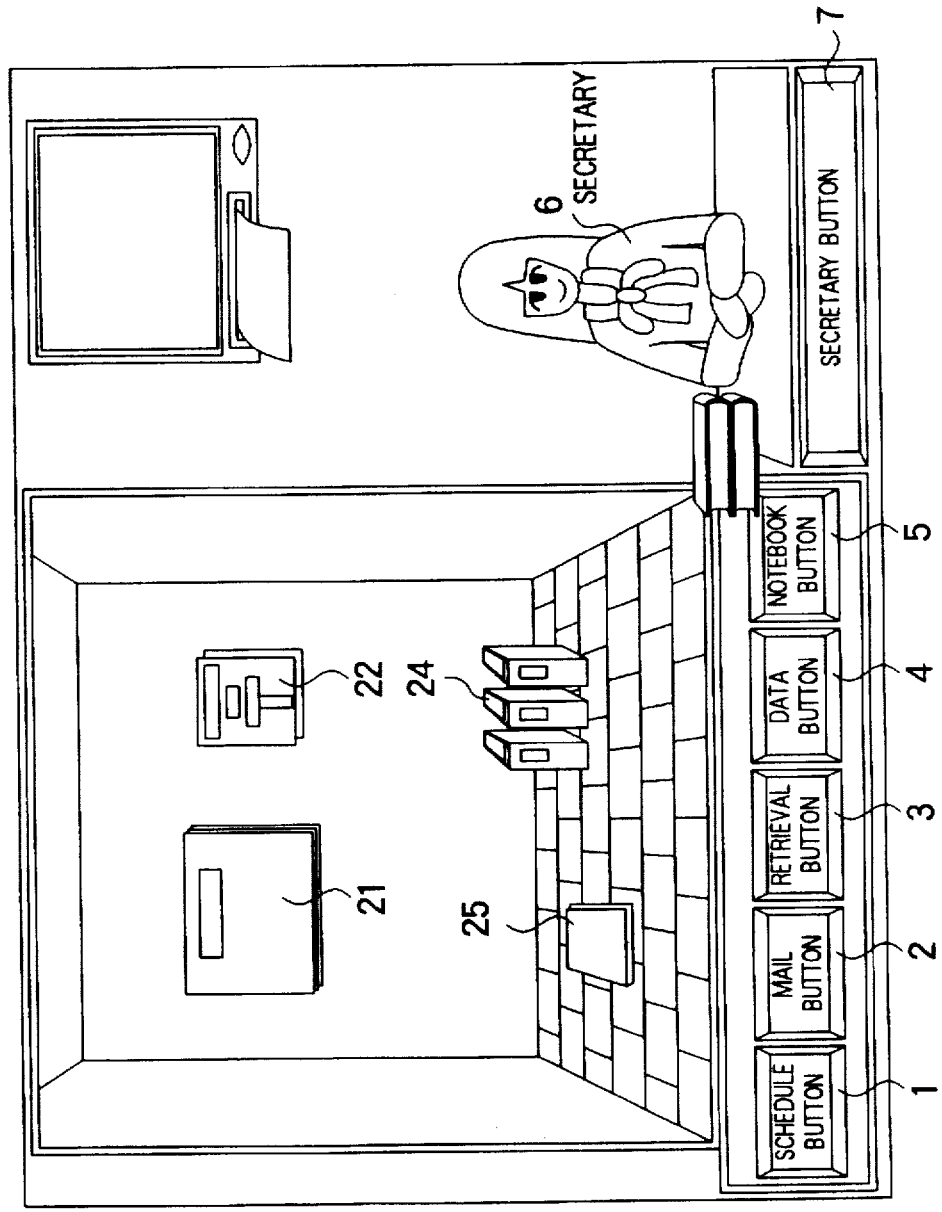
FIG. 16 is to illustrate a practical display image of an electronic secretary system according to the present invention.
Figure 17:
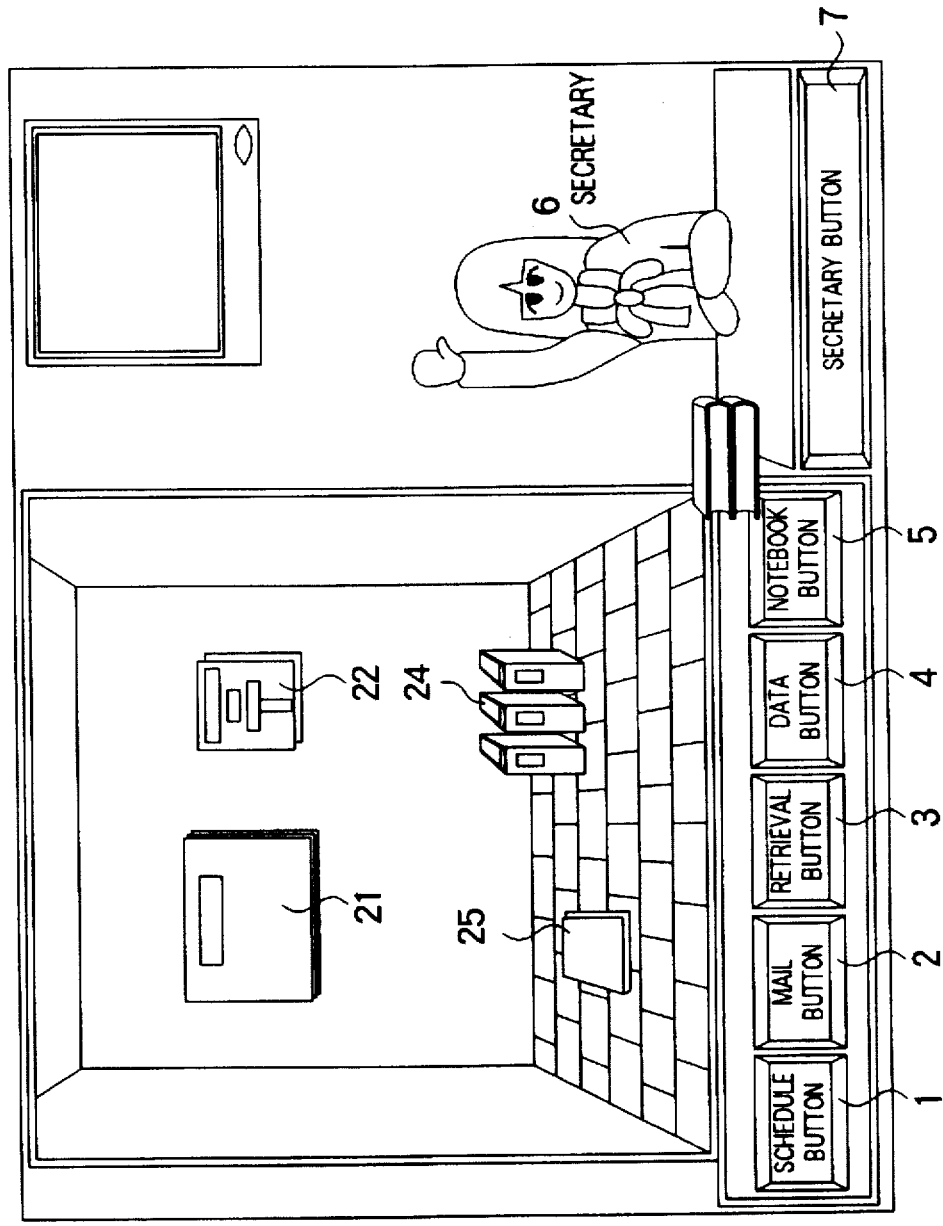
FIG. 17 is to illustrate a practical display image of an electronic secretary system according to the present invention.
Figure 18:
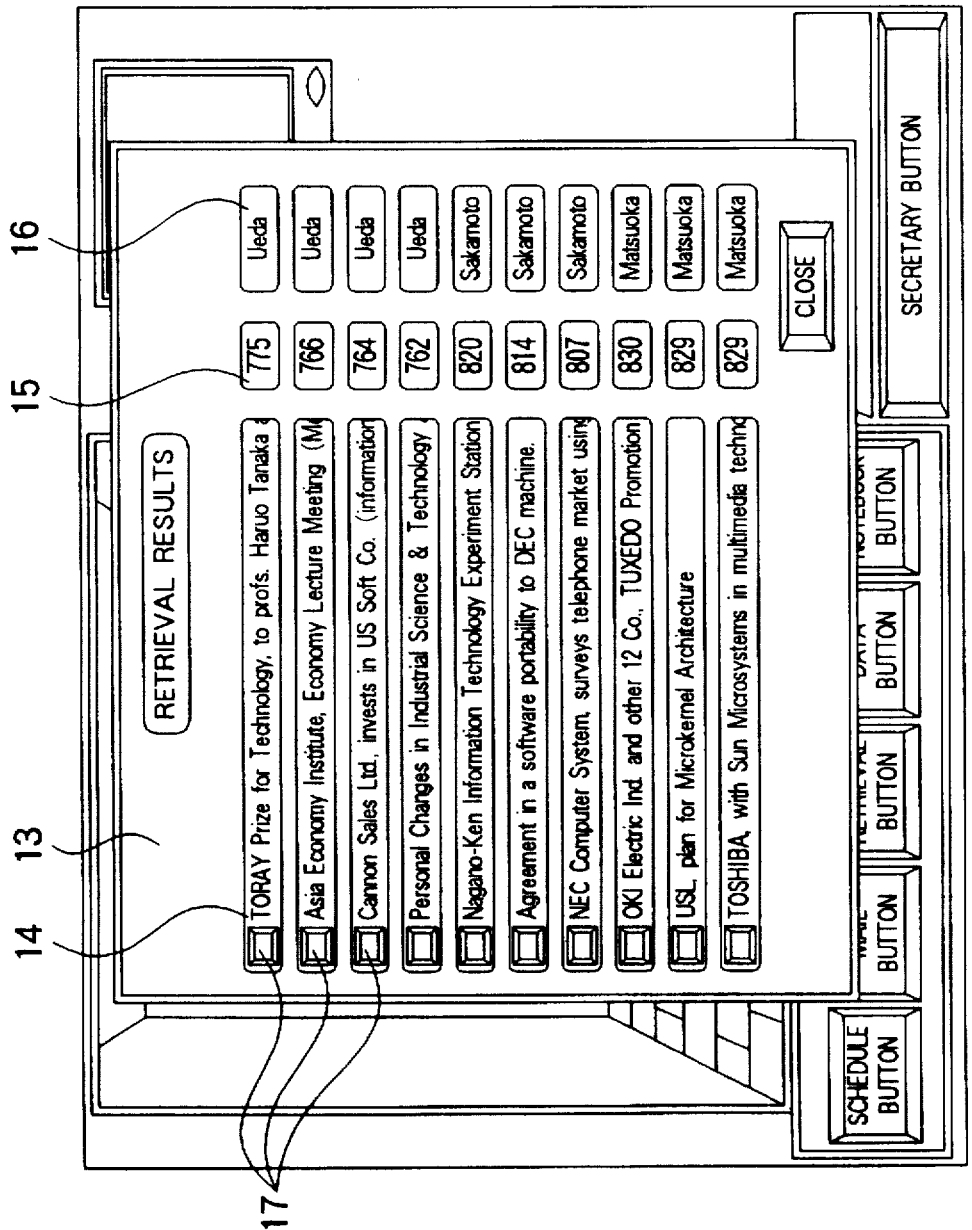
FIG. 18 is to illustrate a practical display image of an electronic secretary system according to the present invention.
Figure 19:
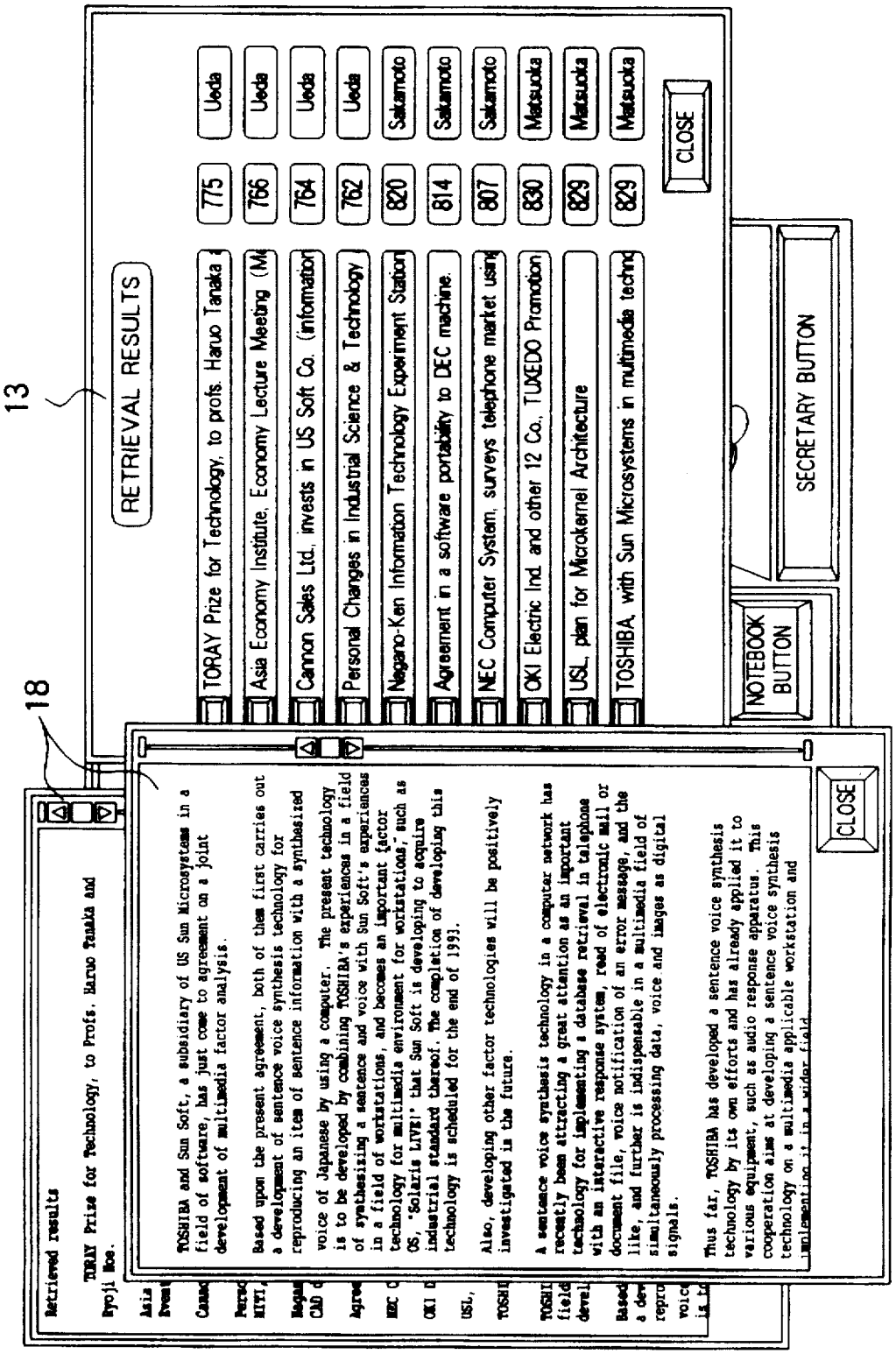
FIG. 19 is to illustrate a practical display image of an electronic secretary system according to the present invention.

After the communication with other equipment ends, a processing of retrieval starts. FIG. 15 shows a bookleafing action of an electronic secretary engaged in retrieval. FIG. 16 shows an example of receiving the retrieved result. FIG. 17 shows an action of an electronic secretary when the request results are returned from all equipment and the retrieval ends. Here, when pressing the secretary button 7, a window 13 for the list of retrieved results is displayed as shown in FIG. 18. The header part 14 of the retrieved sentences, similarity 15 to retrieved keywords and name 16 of returning users of request results is respectively displayed in the window 13. Then, when pressing a button 17 in the header part of sentences, a window 18 having the text of a sentence written thereon is displayed as shown in FIG. 19.

Figure 20:
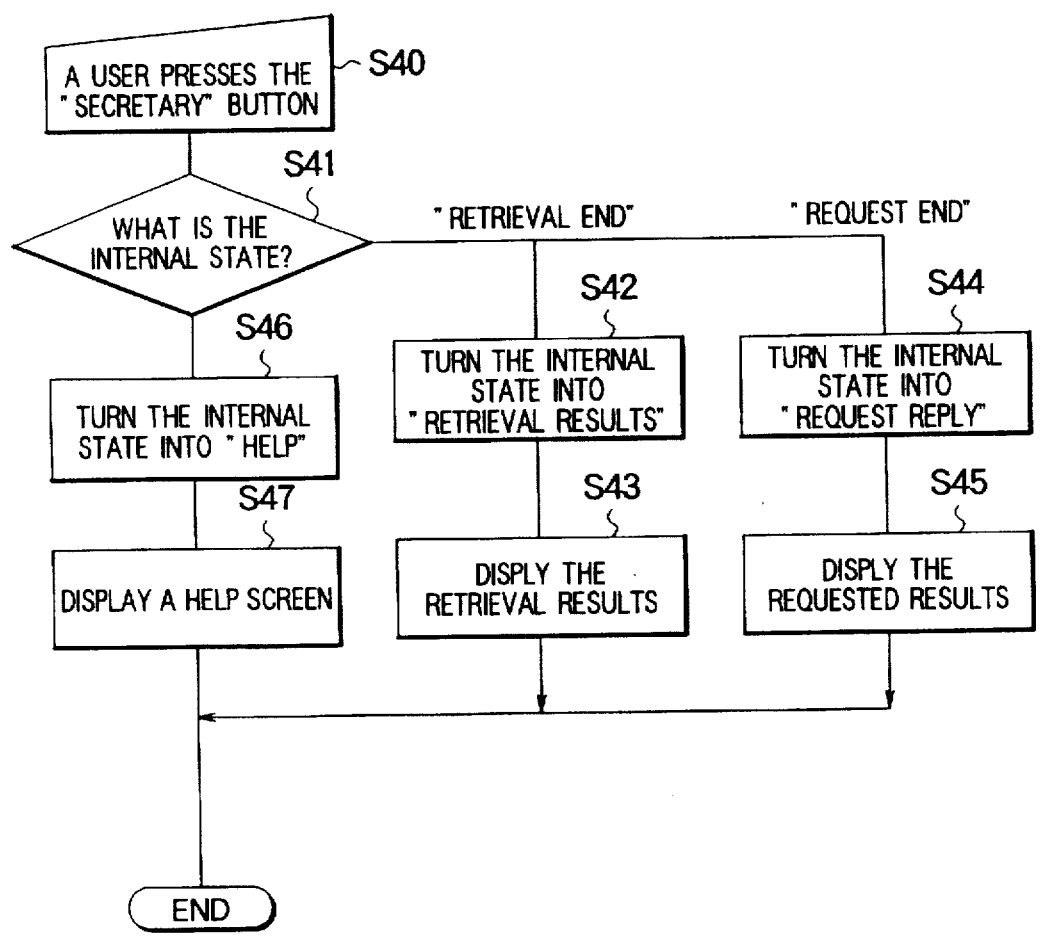
FIG. 20 is a flowchart showing operations of a second embodiment of an electronic secretary system according to the present invention.

Next, an action performed when a user pressed the secretary button 7 will be described along the flowchart of FIG. 20.

Figure 21:
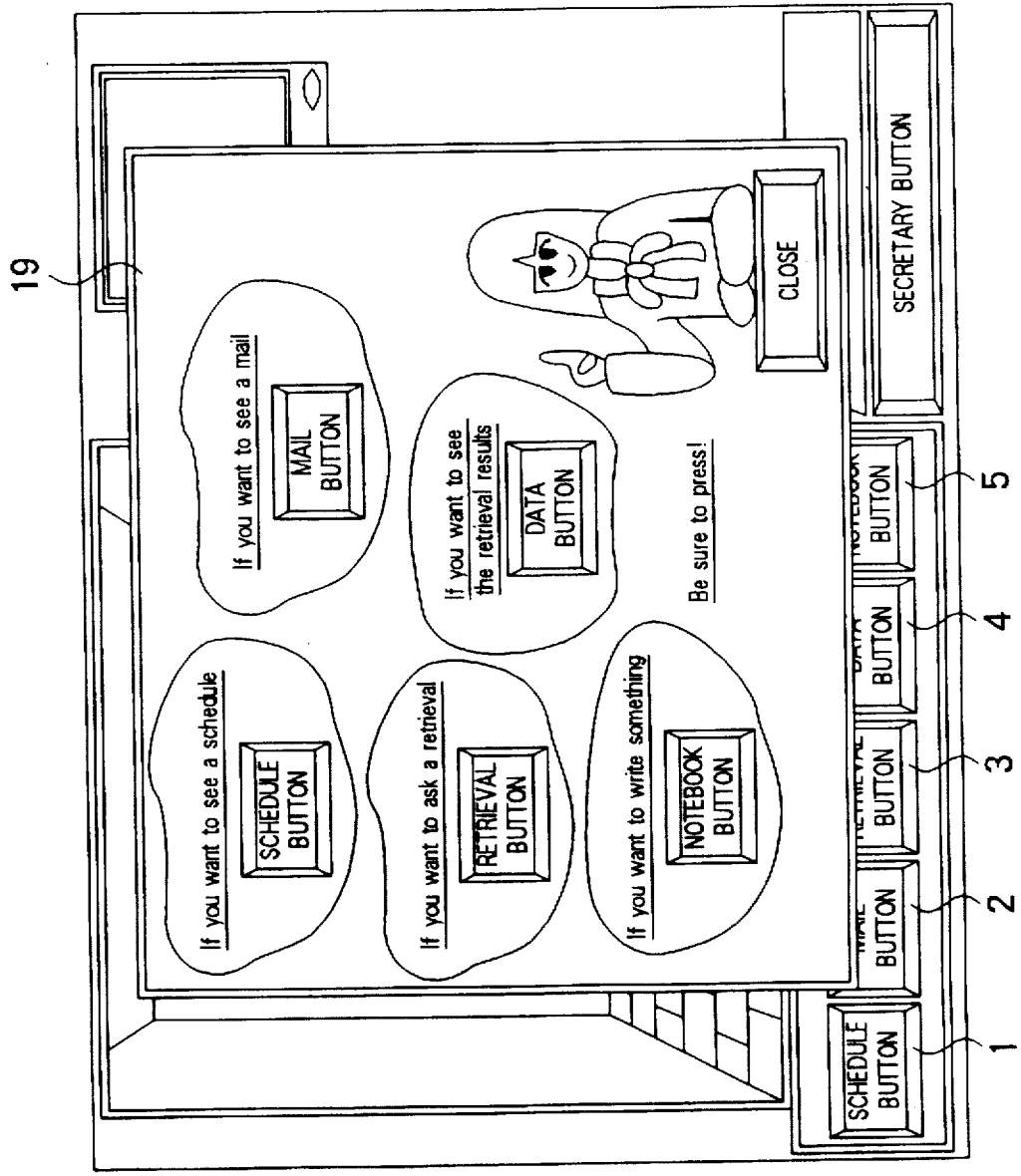
FIG. 21 is to illustrate a practical display image of an electronic secretary system according to the present invention.

When a user presses the secretary button 7 (step S40), the internal state is checked (step S41). If the internal state is "Retrieval End", the internal state is anew turned into "Retrieved Result" (step S42). An action description is read that corresponds to the internal state "Retrieved Result", "The retrieved results are ready" is regenerated and at the same time the retrieved results are displayed (step S43). Or, if the internal state is "Request End", the internal state is anew turned into "Request Reply" (step S44). At this time, an action description is read that corresponds to the internal state "Request Reply". "There has been a request (for retrieval) from Mr (Ueda)" is regenerated and the requested results are displayed (step S45). On the other hand, if the internal state is otherwise, the internal state is anew turned into "Help" (step S46). An action description is read that corresponds to the internal state "Help" and a help screen as shown in FIG. 21 is displayed (step S47). In this example, the state of the self equipment and communication partner equipment is indicated by animation, voice and the like, but may be indicated only by sentences if they represent the state of self and partners.

Figure 22:
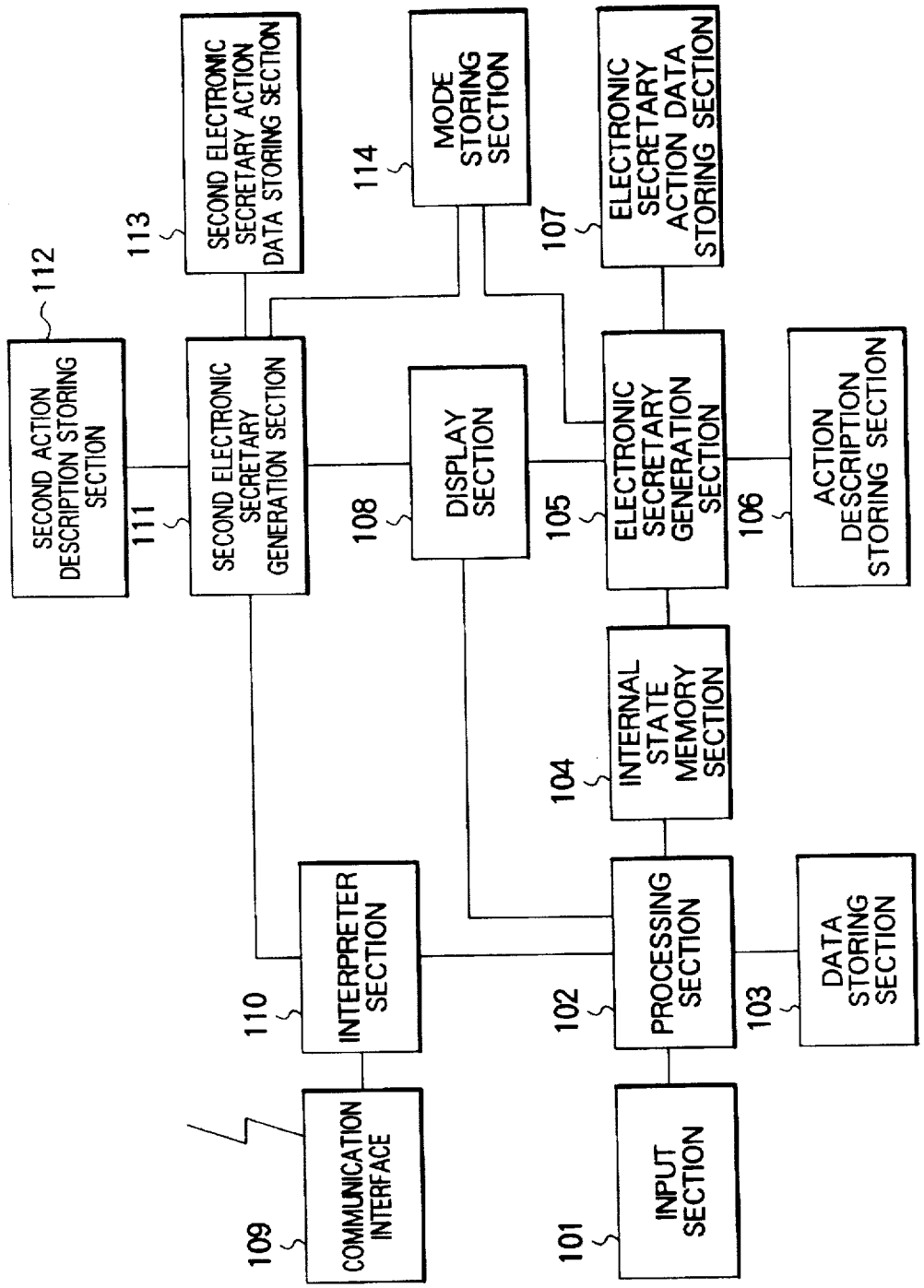
FIG. 22 is a block diagram showing a third embodiment of an electronic secretary system according to the present invention.

Next, a third embodiment of an electronic secretary system according to the present invention will be described referring to FIG. 22. Incidentally, by putting like symbols to constituents similar to those of FIGS. 1 and 9, description is omitted.

The present embodiment is featured by comprising a mode storing section 114 as mode storing means for storing the work environment of a user. Values set depending on the work environment of equipment are stored in the mode storing section 114.

For example, in an equipment that cannot output voice data, a mode to output no voice is set and no voice is outputted when the electronic secretary acts. In this case, it can also be considered to output the voice content in letter. Also, in an equipment that cannot output image data, a mode to output no image is set and no action of the electronic secretary is outputted. In this case, it can also be considered to output the action content of the electronic secretary in letter. Also, it can be considered that a different value is set for each equipment, for example, the background to be displayed for an electronic secretary is varied with individual equipment.

Figure 23:
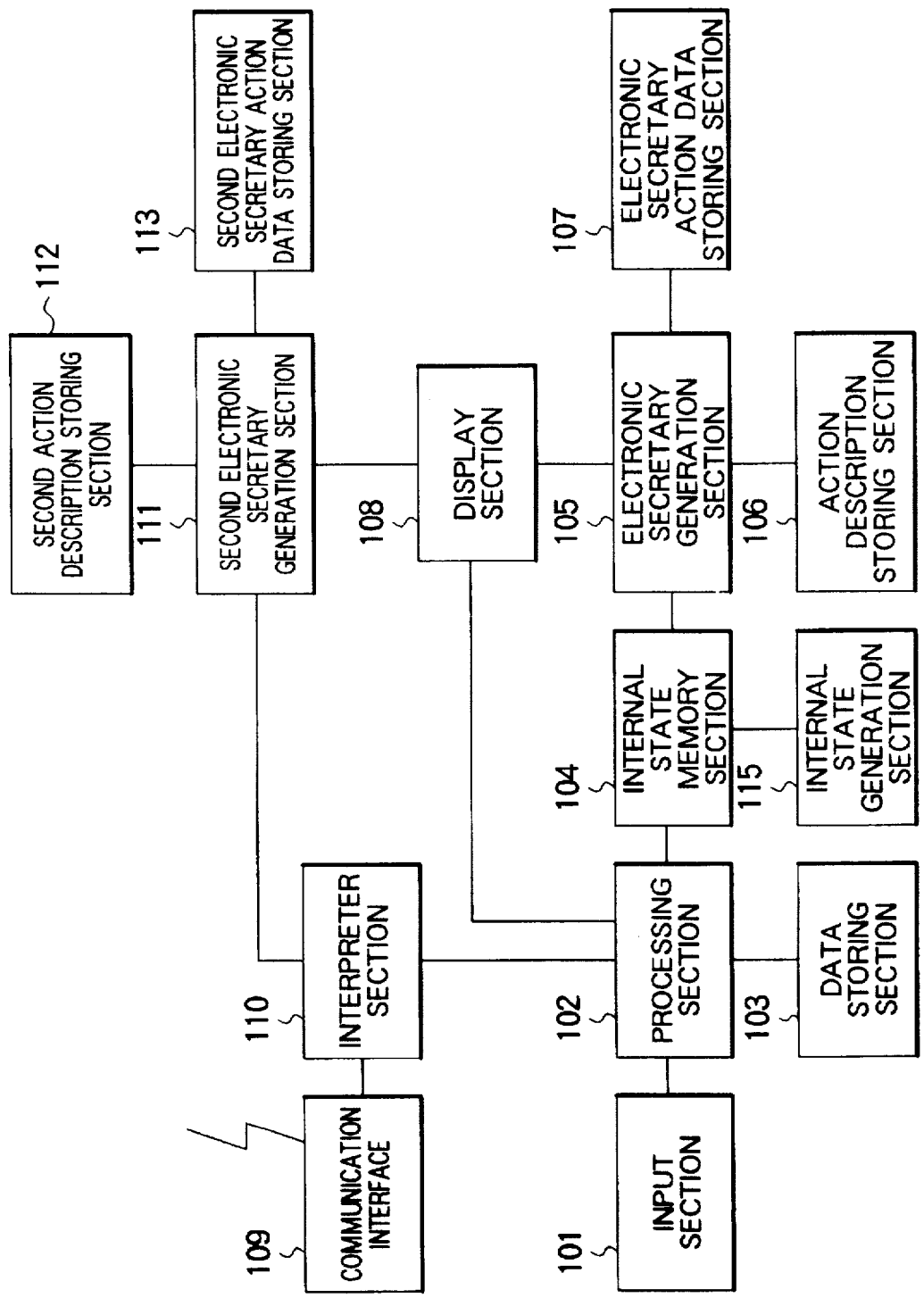
FIG. 23 is a block diagram showing a fourth embodiment of an electronic secretary system according to the present invention.

Next, a fourth embodiment of an electronic secretary system according to the present invention will be described referring to FIG. 23. Incidentally, by putting like symbols to constituents similar to those of FIGS. 1, 9 and 22, description is omitted.

The present embodiment is featured by comprising an internal state generation section 115 for generating the internal state in according with a predetermined principle. The internal state is generated by the internal state generation section 115 in according with a predetermined principle. For example, a teach time determined with a random number, "wink" is written into the internal state memory section 104. When "wink" is described in the internal state memory section 104, the electronic secretary performs an action of wink in accordance with FIG. 2. An action of wink can be implemented by alternately displaying images of opened eye and closed eye. The timing of writing is considered to be performed at each predetermined time or at intervals of time determined with a random number.

Also by comprising timing generation means, it is possible to switch the background of an electronic secretary between that of morning, that of noon and that of night in dependence on the time of day, or to match the background with spring, summer, autumn or winter in dependence on changes of the season, or to change the costume of an electronic secretary.

Next, a fifth embodiment of an electronic secretary system according to the present invention will be described referring to FIG. 24.

Figure 24:
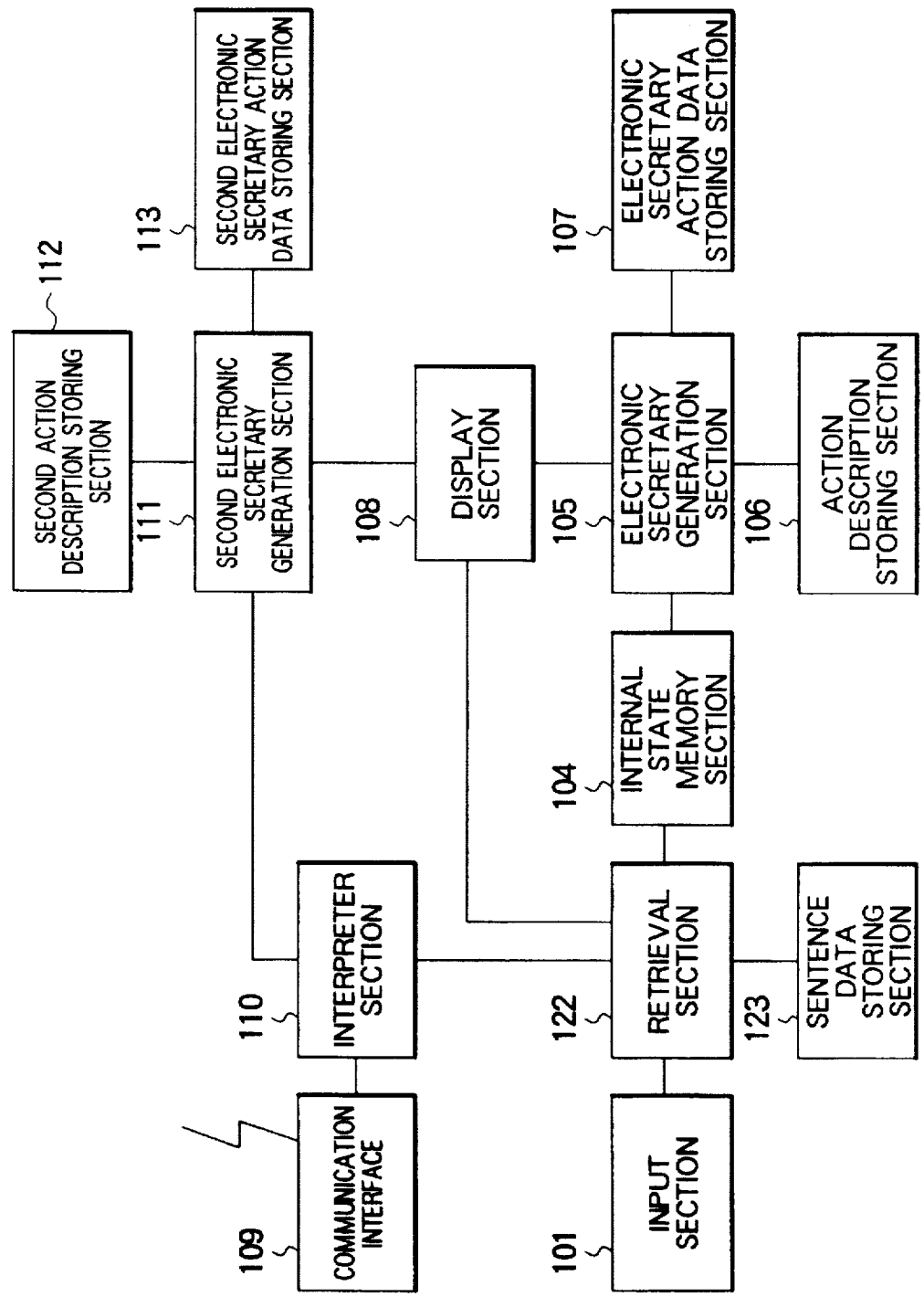
FIG. 24 is a block diagram showing a fifth embodiment of an electronic secretary system according to the present invention.

As shown in FIG. 24, an electronic secretary system according to the present invention comprises: an input section 101, such as mouse and keyboard, for inputting operational information; a document data storing section 123 as storing means for storing document data as data to be retrieved; a retrieval section 122 as retrieval means for retrieving data pertinent to the retrieval condition inputted using the input section 101 from the document data storing section 123 distributed in a plurality of equipment connected through a network; an internal state memory section 104 for memorizing the internal state of processing; an action description storing section 106 for storing the action description of an electronic secretary as an object imitating a human action; an electronic secretary action data storing section 107 for storing data, such as image of an action and voice, of the electronic secretary; an electronic secretary generation section 105 for deciding and generating an action of electronic secretary corresponding to the internal state out of the action description; a display section 108 for displaying an output of the retrieval section 122 and an output of the electronic secretary generation section 105; a communication interface 109 for performing data transfer with other equipment connected through a network; an interpreter section 110 for interpreting data to be transferred and performing data transfer between the retrieval section 122 and communication interface 109; a second action description storing section 112 for storing data describing the action of the electronic secretary in one or more communication partners; a second electronic secretary action data storing section 113 for storing data, such as image of an action and voice, of the electronic secretary; and a second electronic secretary generation section 111 for generating an action of the electronic secretary.

Next, actions in the case of retrieval will be described along the flowchart of FIG. 4.

When a user selects a "Retrieval" button by using a mouse or the like (step S11), "Retrieval Start" is written into the internal state memory section 104 by the retrieval section 122 (step S12) and at the same time a window for keyword input is opened. When "Retrieval Start" is written in the internal state memory section 104, an action of the electronic secretary corresponding to "Retrieval Start" is read out from data of FIG. 2 stored in the action description storing section 106, and voice data "Input a keyword", stored in the electronic secretary action data storing section 107 is regenerated. At this time, the mouth of the electronic secretary moves corresponding to an output of voice data, where the movement of the mouth is implemented by an alternate display of images of closed mouse and opened mouth during voice output. From this on, similarly when a voice is outputted, the mouth of the electronic secretary moves during voice output. Incidentally, the number of internal states may be plural. For example, it can also be set that a state of retrieval start sets in while keeping a state of request receipt. This means that the system stands in an allowable state of receiving a request from a user and the electronic secretary performs an action of retrieval start.

When a user inputs a keyword by using a keyboard (step S13), the retrieval section 122 decides whether the "Break" button was pressed or not (step S14). If the "Break" button is pressed, the retrieval processing is broken off. If deciding that the "Break" button is not pressed, it is decided whether the "Retrieval" button is pressed (step S15). If the "Retrieval" button is not pressed, the system returns to the step 14. Or, if the "Retrieval" button is pressed, "Partner Selection" is written in the internal state storing section 104 (step S16). When "Partner Selection" is written, "Whom do you ask?" is regenerated as an action of the electronic secretary from data of FIG. 2. A "Name" button of the partner to be asked for retrieval is selected using a mouse or the like by a user (step S17). A mark is placed on the people selected and it is decided whether the "Break" button is pressed or not (step S18). If the "Break" button is pressed, the retrieval processing is broken off. Or, if the "Break" button is not pressed, it is decided whether the "OK" button is pressed (step S19). If the "OK" button is not pressed, the system returns to the step S18. Or, if the "OK" button is pressed, a communication with other equipment starts (step S20).

Then, when the transmit processing of requests for all selected communication partners ends (step S21), the processing of retrieval starts (step S22). Retrieval can be executed, for example, by a method for extracting a sentence in which any of keywords of sentence data stored in the document data storing section 123 and a keyword inputted by a user is coincident or similar. During retrieval, "During Retrieval" is written into the internal state storing section 104. When the internal state is "During Retrieval", an action of leafing through a book is performed as an electronic secretary's action from data of FIG. 2. This processing is performed for all data till the retrieval is completed (step S23).

Next, actions during communication will be described.

As shown in FIG. 5, when advancing a request from Equipment A to Equipment B, the internal state of Equipment A becomes "Communication Start Transmit" and a request of communication start is transmitted to Equipment B. At this time, not only a request of communication start but also the user's name and internal state of Equipment A on the transmitter side are transmitted. In the interpreter section 110 of Equipment B on the receiver side, a request of communication start is outputted to the retrieval section 122 and the user's name and internal state, information related to the electronic secretary of Equipment A is outputted to the second electronic secretary generation section 111. In the second electronic secretary generation section 111, the action description of an electronic secretary corresponding to the internal state and data on an action of the electronic secretary responsive to the user's name are read from the second action description storing section 112 and second electronic secretary action data storing section 113 respectively, and actions of the electronic secretary are generated.

Figure 25:
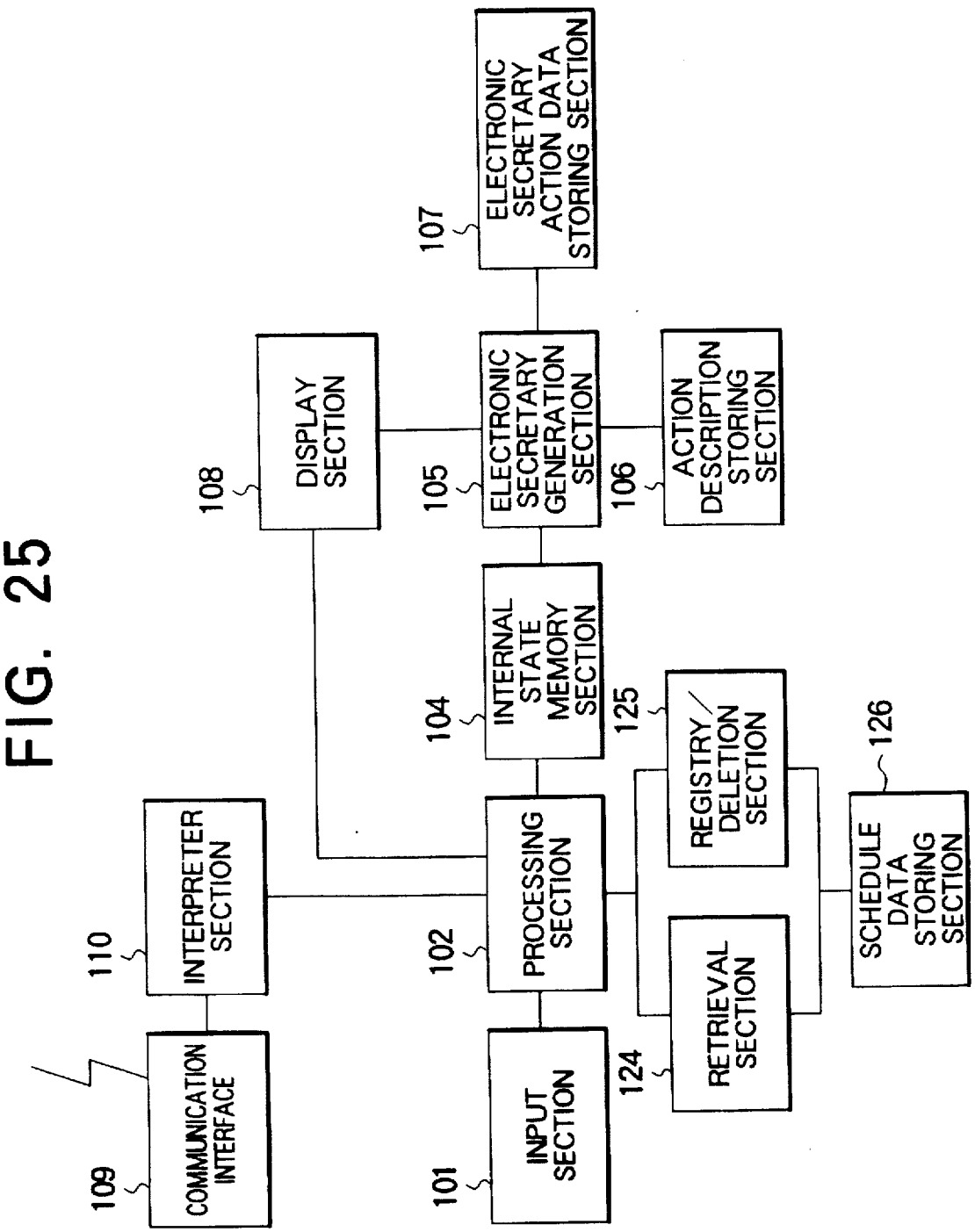
FIG. 25 is a block diagram showing a sixth embodiment of an electronic secretary system according to the present invention.

Next, a sixth embodiment of an electronic secretary according to the present invention will be described referring to FIG. 25. Incidentally, by putting like symbols to constituents similar to those of FIG. 1, description is omitted.

The present embodiment is featured by comprising: a retrieval section 124 for performing a retrieval of schedule data through a network; a registry/deletion section 125 for performing a registry or deletion of schedule data through a network; and a schedule data storing section 126 for storing schedule data.

Next, actions of the transmit side and receive side will be described along the flowcharts of FIG. 26. First, actions of the transmit side will be described along the left flowchart of FIG. 26.

Figure 26:
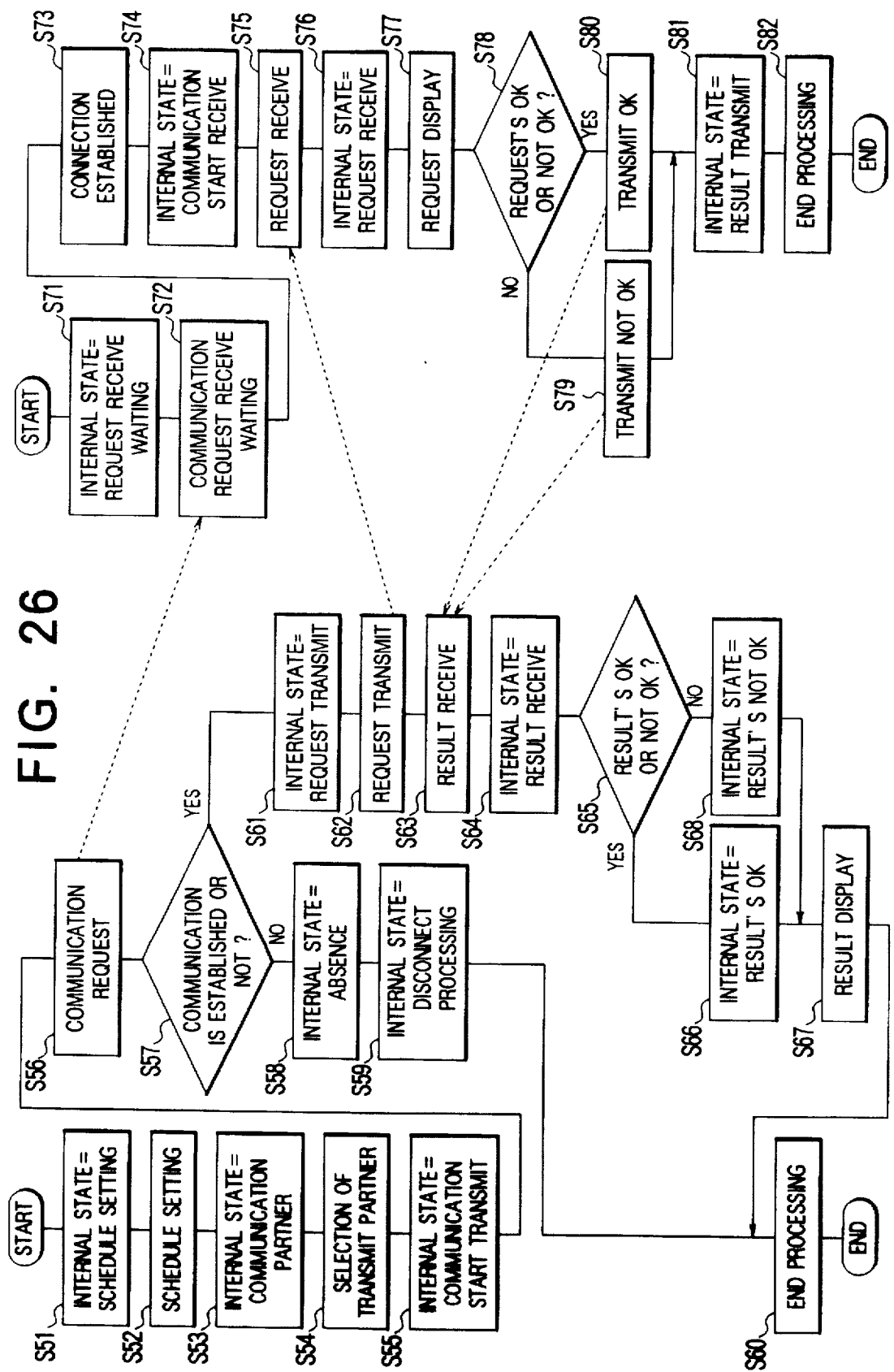
FIG. 26 is a flowchart showing operations of a sixth embodiment of an electronic secretary system according to the present invention.
Figure 27:
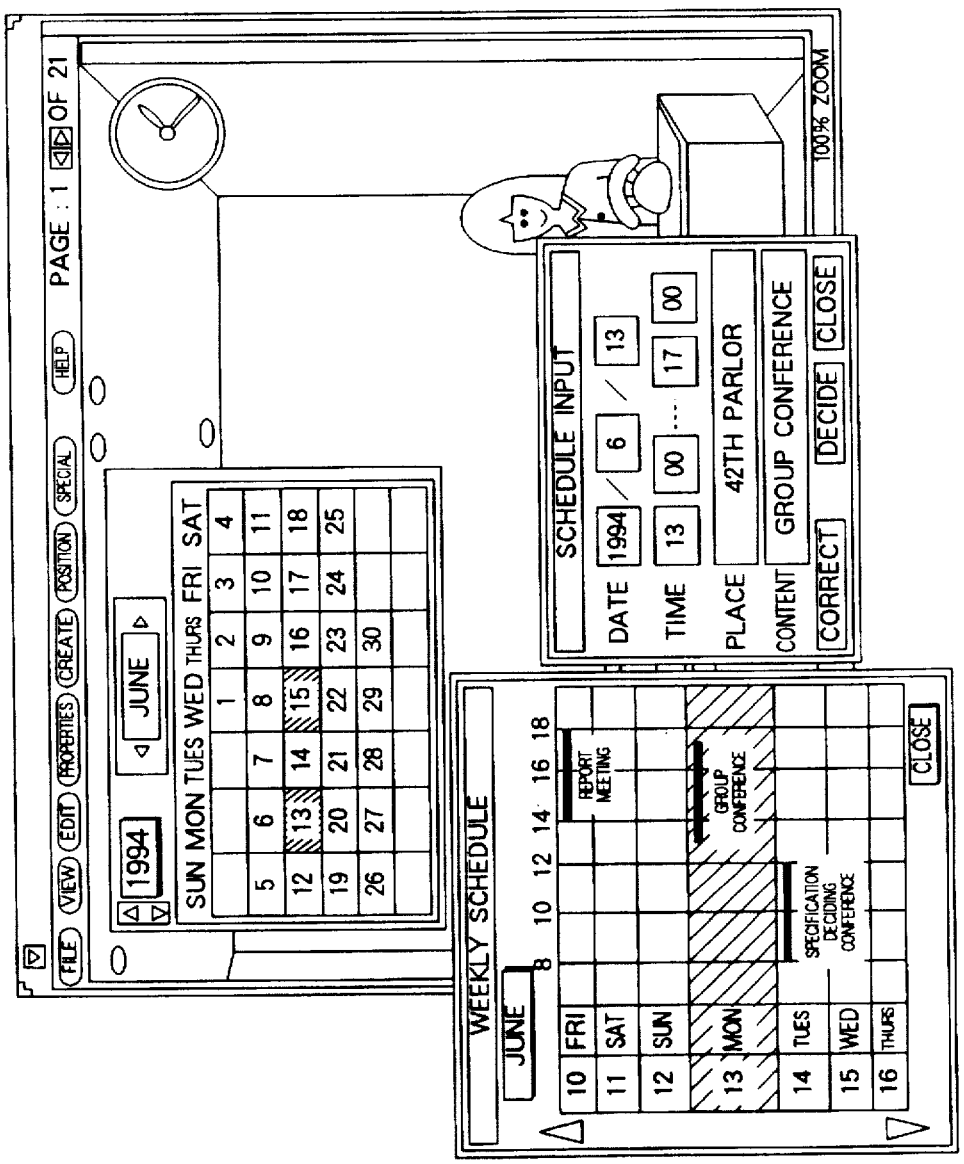
FIG. 27 is to illustrate a practical display image of an electronic secretary system according to the present invention.
Figure 28:
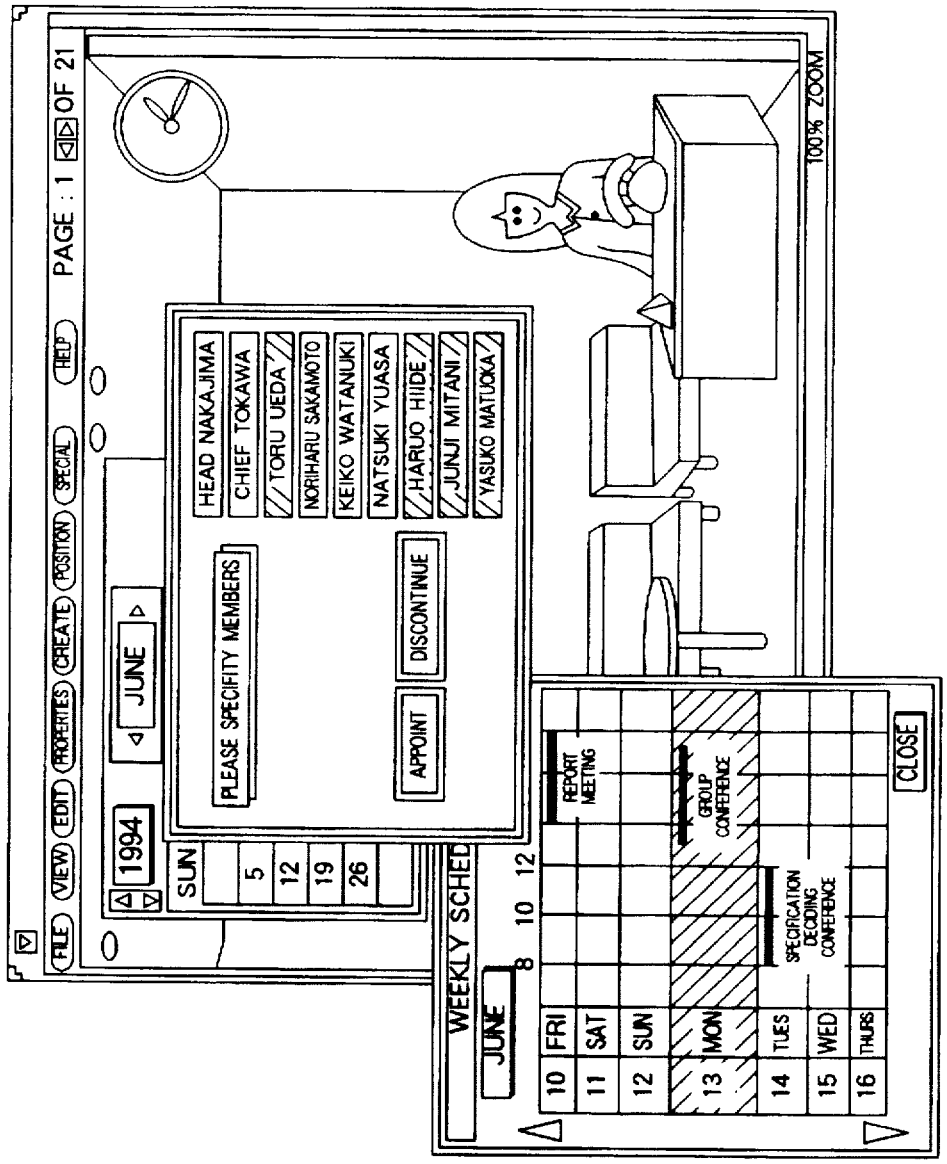
FIG. 28 is to illustrate a practical display image of an electronic secretary system according to the present invention.
Figure 29:
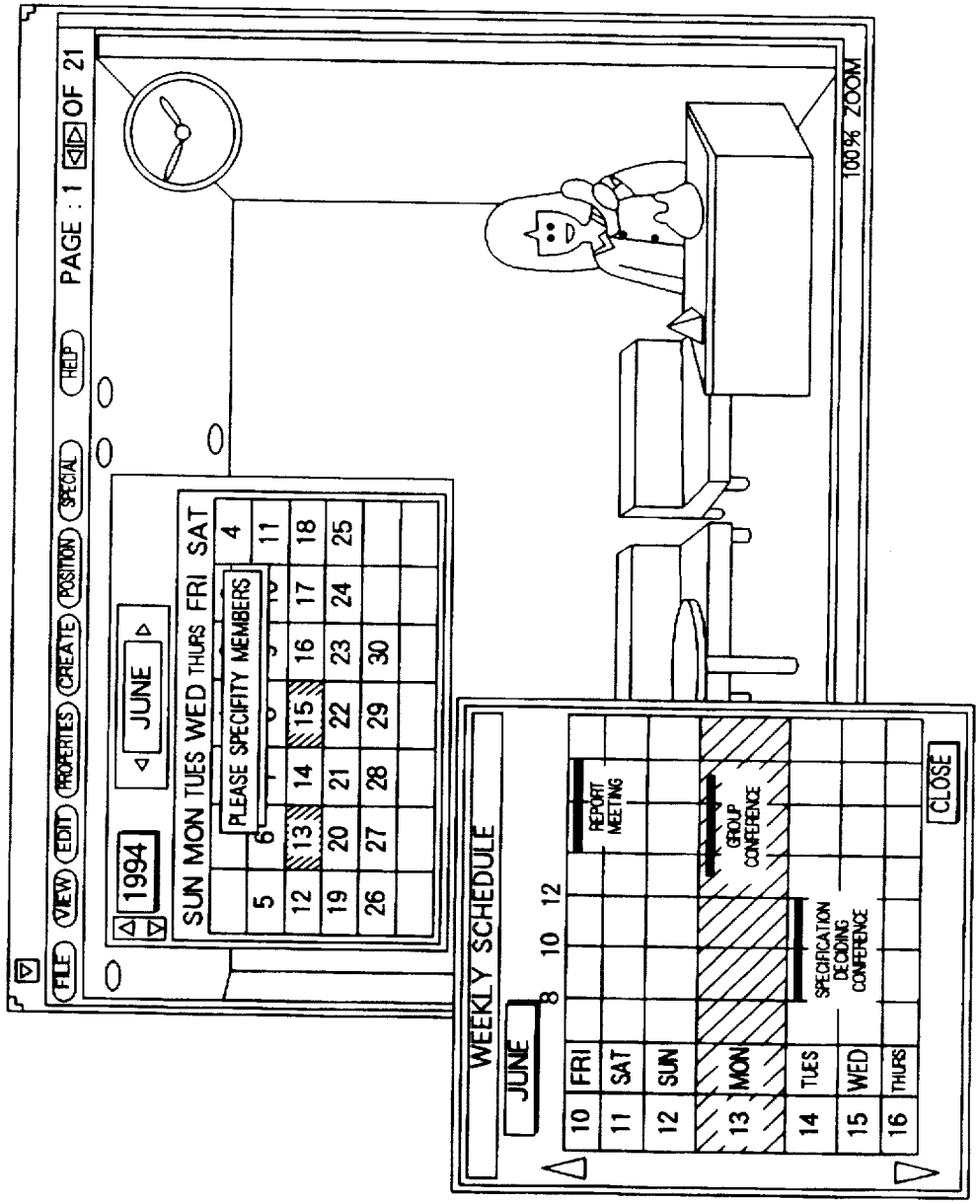
FIG. 29 is to illustrate a practical display image of an electronic secretary system according to the present invention.

When the flow of FIG. 26 is called from the main flow of FIG. 26 and a schedule setting mode sets in, the internal state is turned into schedule setting by the processing section 102 in the internal state memory section 104 (step S51). A screen for setting a schedule as shown in FIG. 27 is displayed on the display section 108 and the system waits an input of schedule data from a user (step S52). When the internal state changes, an electronic secretary action is generated in accordance with FIGS. 2 and 3. Incidentally, FIG. 2 describes part of actions and does not describe some of those appearing in the flow of FIG. 26. As shown in FIG. 28, the internal state is made a communication partner of by the processing section 102 (step S53). An input of a transmit partner in a request of schedule is waiting for (step S54). As shown in FIG. 29, the internal state is turned into communication start transmit (step S55). Request for communication to the equipment of a specified partner is generated (step S56). It is decided whether a connection to the communication partner is established or not (step S57). If no connection with communication partner is established, a decision of communication connection is performed (step S58). As a result, if no connection was possible, the internal state is turned into absence, to a user is notice given through an electronic secretary that no connection with the partner was possible. Then, the internal state is turned into discontinue processing and notice is given to a user through an electronic secretary that to make a connection will be given up (step S59). Then, end processing is performed (step S60). Incidentally, when a connection was impossible, various other processing, such as asking a user whether request for reconnection is performed or not, are considered.

Figure 30:
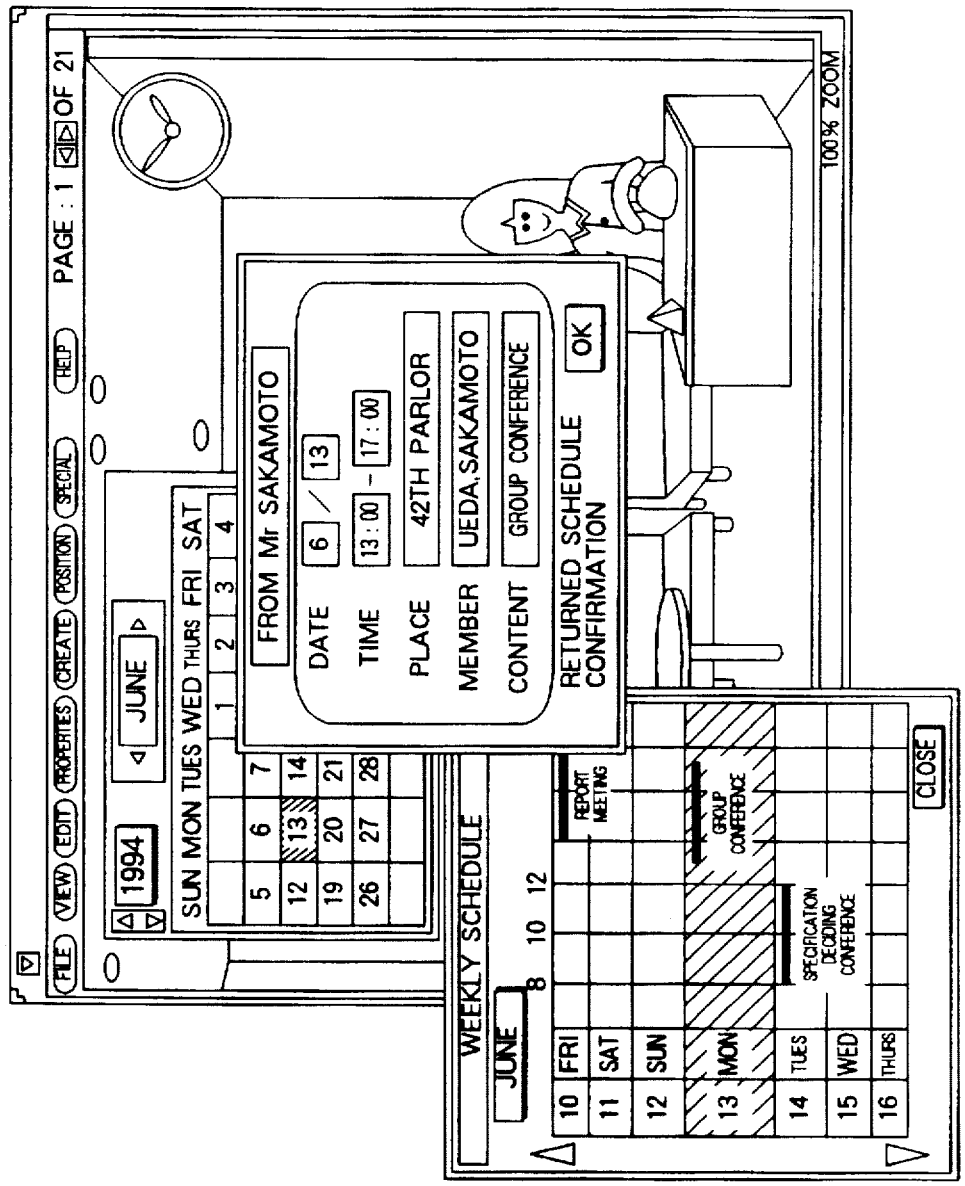
FIG. 30 is to illustrate a practical display image of an electronic secretary system according to the present invention.

In the above step S57, when a connection with the communication partner is established, the internal state is tuned into request transmit (step S61), and notice is given to a user through an electronic secretary that a request for a current schedule is sent to the communication partner. Actually, a request for schedule is sent to the communication partner (step S62). The result of whether a request is accepted or not is waited (step S63). The internal state is turned into receive result (step S64), notice is given to a user through the electronic secretary that the result of schedule request arrived from the communication partner. It is decided whether the result of schedule request is OK or not OK (step S65). If the result of schedule request is OK, the internal state is turned into result OK and the electronic secretary is made to indicate that the request was accepted (step S66). As shown in FIG. 30, the detailed result of schedule request is displayed (step S67). Or, if the result of schedule request is not OK, the electronic secretary is made to indicate that the request was rejected. Here, only the outline of the currently processed content is displayed using voice/letter or image to a user by the electronic secretary and the detailed information is presented directly to a user. However, by writing not only state information, such as waiting for simple request receive, about internal state, but also detailed information, such as date, time, partner and content of schedule request presented, into the internal state, it is also possible that an electronic secretary indicates detailed information collectively to a user. Furthermore, the end processing, such as end of communication accompanying the end of schedule setting is performed (step S60).

Next, actions on the receive side will be described along the right flowchart of FIG. 26.

Figure 31:
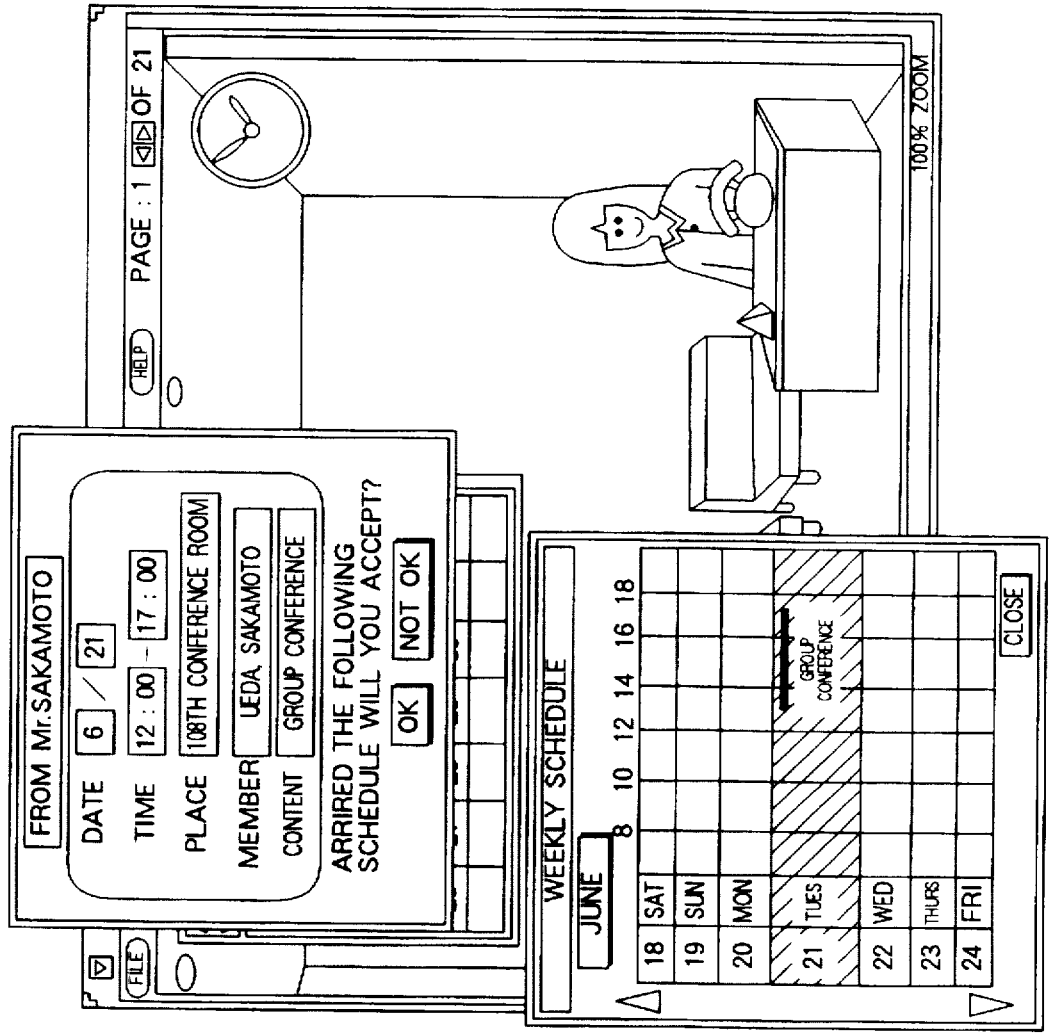
FIG. 31 is to illustrate a practical display image of an electronic secretary system according to the present invention.

The internal state is turned into request receive wait, and an electronic secretary is made to display the request receive wait (step S71). The system comes to wait for receiving the communication request through a network (step S72). A connection request is received and a network is established (step S73). The internal state is turned into communication start receive, and the electronic secretary is made the display of replying (step S74). A request for schedule is received (step S75). The internal state is turned into request receive and the electronic secretary is made the display of receiving a request (step S76). As shown in FIG. 31, the details of the request is displayed (step S77). A user's input telling the intention to accept or to refuse the schedule request is waited for and the input is checked (step S78). If the request is refused, not OK is transmitted (step S79). Or, if accepted, OK is transmitted (step S80). The internal state is turned into result transmit and the electronic secretary is made the display of transmitting the results (step S81). The end processing, such as end of communication, is performed (step S82).

Figure 32:
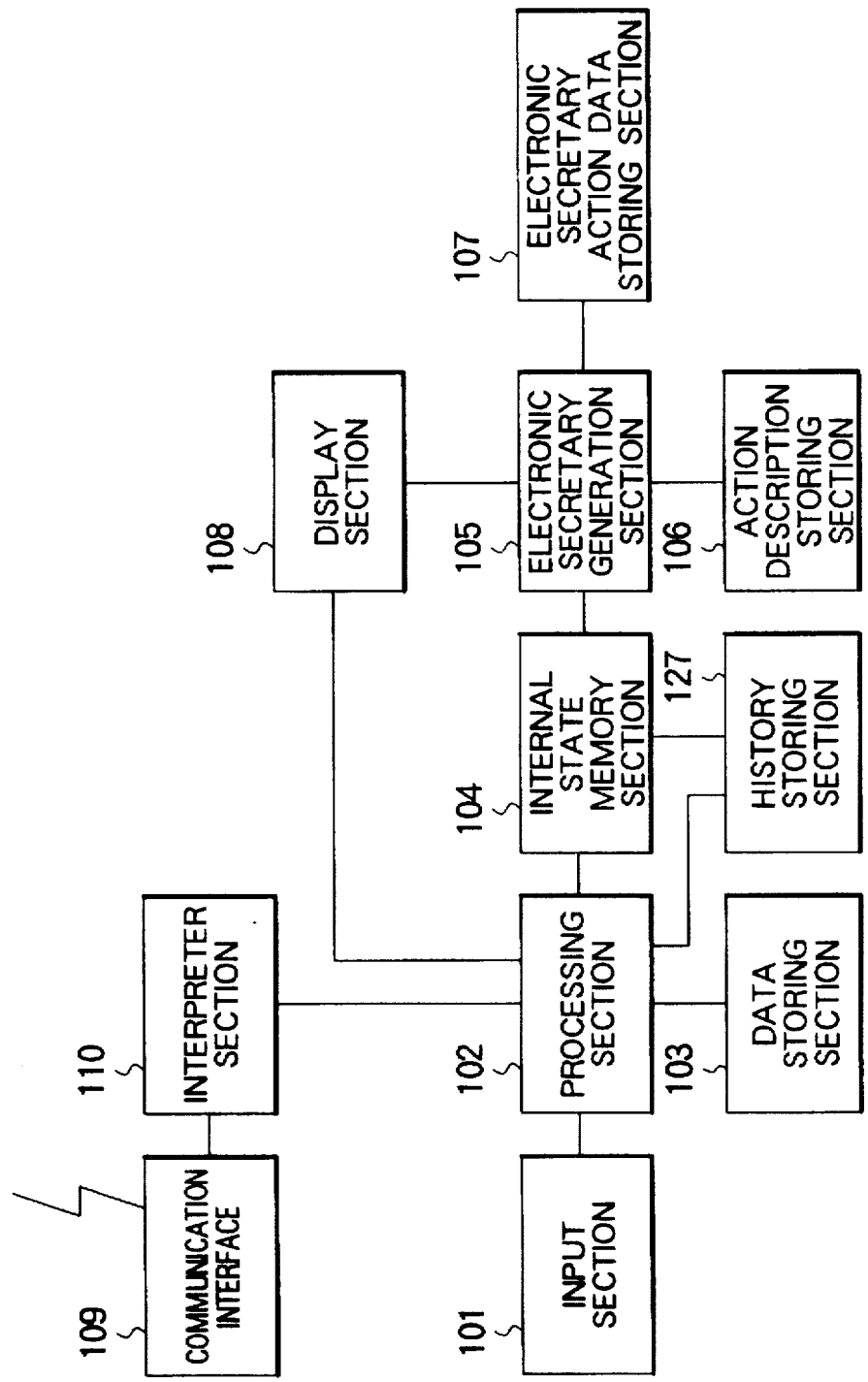
FIG. 32 is a block diagram showing a seventh embodiment of an electronic secretary system according to the present invention.

Next, a seventh embodiment of an electronic secretary system according to the present invention will be described referring to FIG. 32. Incidentally, by putting like symbols to constituents similar to those of FIGS. 1, description is omitted.

The present embodiment is featured by comprising: a history memory section 127 as history memory means for memorizing the history of the internal state to be memorized in the internal state memory section 104. Incidentally, if there is a problem in that the memory capacity becomes insufficient when the whole history is memorized, a ring buffer in which a predetermined number of histories from the most recent are memorized is desirable. Also, inside the history memory section, there are a time generation section and a consecutive number generation section and it is desired to memorize the generating time and the serial number of the internal state as well as the internal state. And, on the display section 108, the history including detailed information among the internal state is displayed.

Next, a eighth embodiment of an electronic secretary system according to the present invention will be described referring to FIG. 34. Incidentally, by putting like symbols to constituents similar to those of FIG. 1, description is omitted.

The electronic secretary system comprises: an electronic mail processing section 128 as electronic mail processing means for processing data interpreted as an electronic mail by the interpreter section 110; an electronic mail storing section 129 for storing data interpreted as an electronic mail; a header storing section 130 as header storing means for storing the header information of an electronic mail letter; and a classification section 131 as classification means for classifying the electronic mail letters stored in the electronic mail storing section 129.

Actions of the electronic secretary corresponding to the internal state stored in action description storing section 106 include not only those shown in FIG. 2 but also those shown in FIG. 35. The internal state written in the internal state memory section 104 is read out by electronic secretary generation section 105. The action description corresponding to the internal state is read from data stored in the action description storing section 106. Based on the read action description, a voice, image or the like stored in the electronic secretary action data storing section 107 are displayed on the display section. The number of internal states may be plural. These actions are repeated at each predetermined time, or performed whenever the internal states change.

Figure 36A:
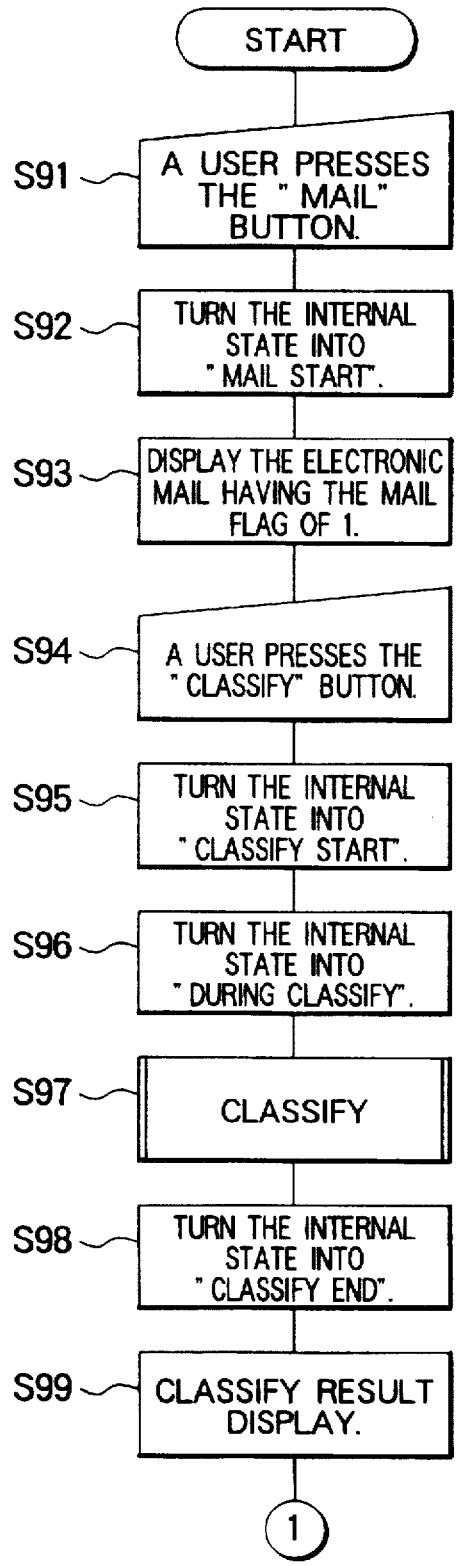
FIG. 36a is a flowchart showing operations of an eighth embodiment of an electronic secretary system according to the present invention.
Figure 36B:
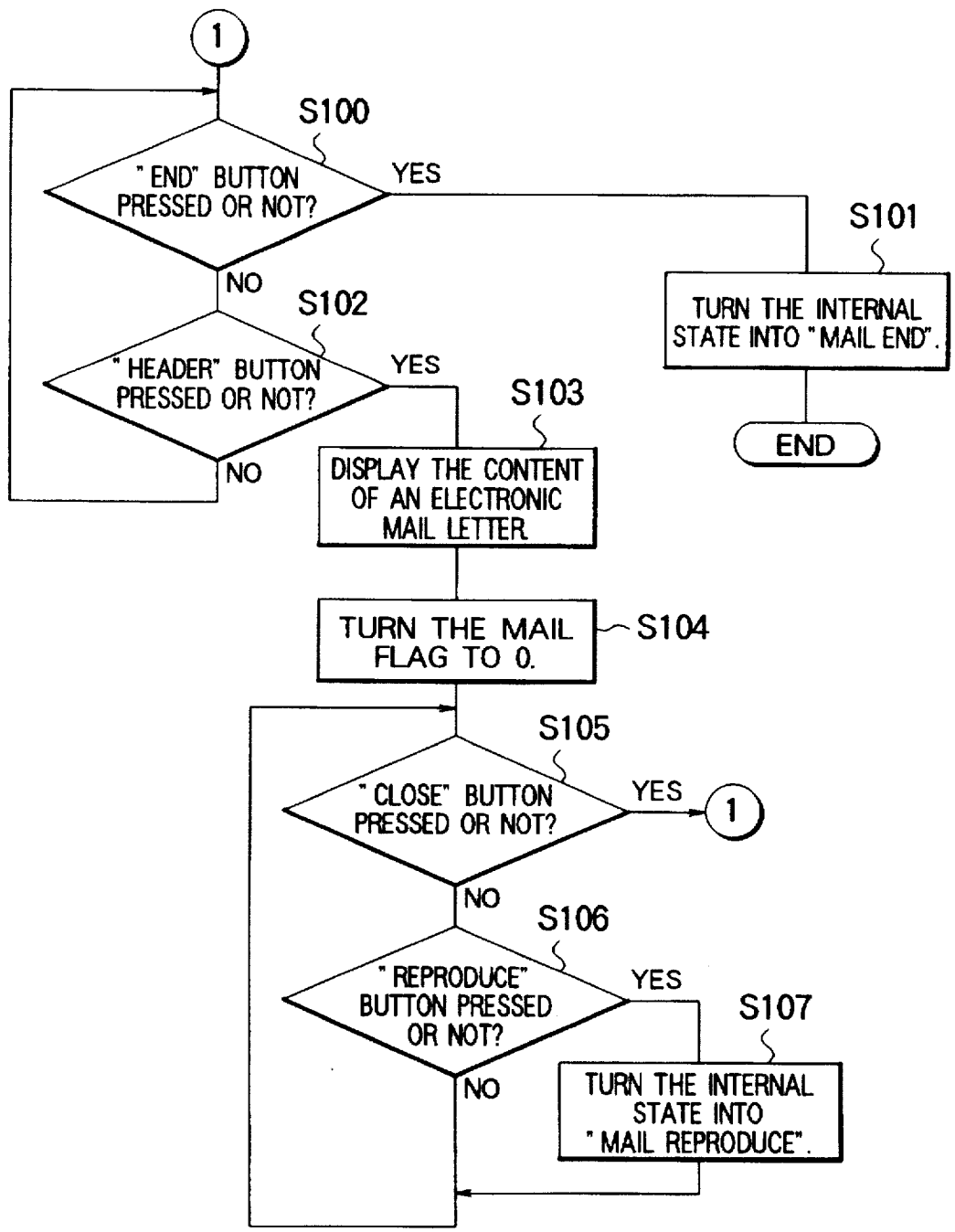
FIG. 36b is a flowchart showing operations of an eighth embodiment of an electronic secretary system according to the present invention.

Next, the classification processing will be described along the flowcharts of FIGS. 36a and 36b.

First, when a user presses a "mail" button (step S91), "Mail Start" is written into the internal state memory section 103 by the processing section 102 (step S92). From data stored in the action description storing section 106 as shown in FIG. 35, the action description corresponding to the internal state is read out and a mail screen is displayed on the display section 108. In an electronic mail letter, a mail flag is set by the electronic mail processing section 128. The mail flag is set to 1 for an electronic mail letter not yet read and to 0 for an electronic mail already read. By the electronic mail processing section 128, electronic mail letters having the mail flag of 1 are retrieved and the header information is displayed in a list (step S93). Then, when a user presses a "classifying" button (step S94), "Classifying Start" is written into the internal state memory section 104 (step S95). From data shown in FIG. 35, voice data "Classify", stored in the electronic secretary action data storing section 107, is regenerated and classifying starts. While classifying starts, "During Classifying" is written into the internal state memory section 104 (step S96) and in accordance with data shown in FIG. 35, the manner of an electronic secretary classifying the "header" buttons according to categories is displayed (step S97).

Figure 37:
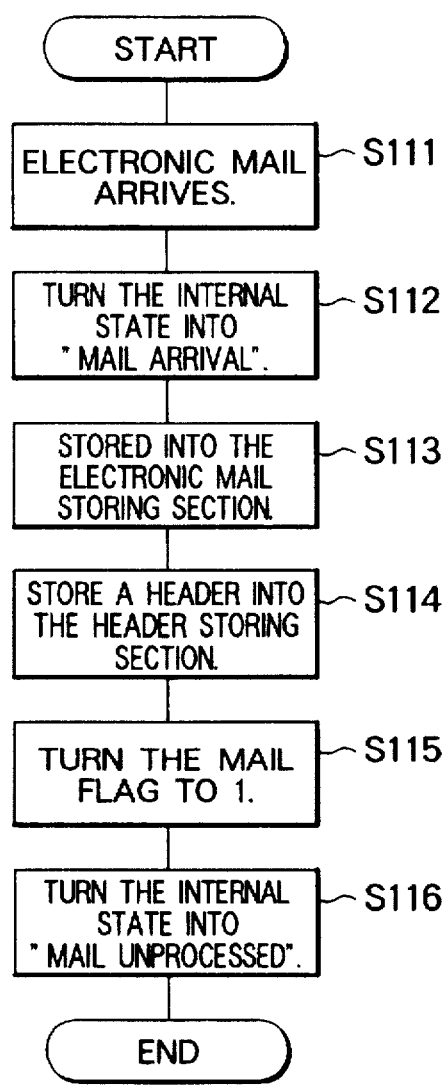
FIG. 37 is a flowchart showing operations of an eighth embodiment of an electronic secretary system according to the present invention.

When classifying ends, "Classifying End" is written into the internal state memory section 104 (step S98), an action of "During Classifying" is completed in accordance with data shown in FIG. 35. The classified results are delivered to the processing section 102, classified according to categories and outputted from the display section 108 (step S99). At this time, an "End" button is displayed. When a user presses the "End" button (step S100), "Mail End" is written into the internal state memory section 104 (step S101) and the mail screen closes in accordance with data shown in FIG. 35. Or, when a user does not press the "End" button, press of the "header" button by a user (step S102) causes the electronic mail letter corresponding to the header pressed to be retrieved in the electronic mail processing section 128 and the content of the electronic mail letter is displayed (step S103). When the content of the electronic mail letter is called in the electronic mail processing section 128, the mail flag for the electronic mail letter is set to 0 (step S104). Then, it is decided whether a user pressed a "Close" button or not (step S105). If a user presses the "Close" button, the indication of the content distinguishes and the system returns to the above step S100. Or, if it was decided that a user did not press the "Close" button, it is decided whether a user pressed a "Reproduce" button (step S106). If it was decided that a user did not press the "Reproduce" button, the system returns to the above step S105. If it was decided that a user pressed the "Reproduce" button, "Mail Reproduce" is written into the internal state memory section 104 (step S106), and image data, voice data or the like contained in data of the electronic mail letter are reproduced in accordance with data shown in FIG. 35. Then, the processing to be performed when a new electronic mail arrived will be described along the flowchart of FIG. 37.

When the electronic mail arrives at the communication interface 109 (step S111), data of the electronic mail is sent to the electronic mail processing section 128 through the interpreter section 110. At this time, "Mail Arrival" is written into the internal state memory section 104 (step S112) and in accordance with data stored in the action description storing section 106 as shown in FIG. 35, an action of the electronic secretary receiving a postal card is outputted from the display section 108. An electronic mail is stored in the electronic mail storing section 129 by the electronic mail processing section 128 (step S113) and the header information is stored in the header storing section 130 (step S114). The mail flag of this electronic mail is set to 1 (step S115). "Mail Unprocessed" is written into the internal state storing section 104 (step S116) and in accordance with data stored in the action description storing section 106 as shown in FIG. 35, a postal card is displayed on the desk of an electronic secretary. So long as an electronic mail having the mail flag of 1 is present in the electronic mail processing section 128, the internal state remains "Mail Unprocessed" and the display of the postal card is kept to be outputted.

Figure 38:
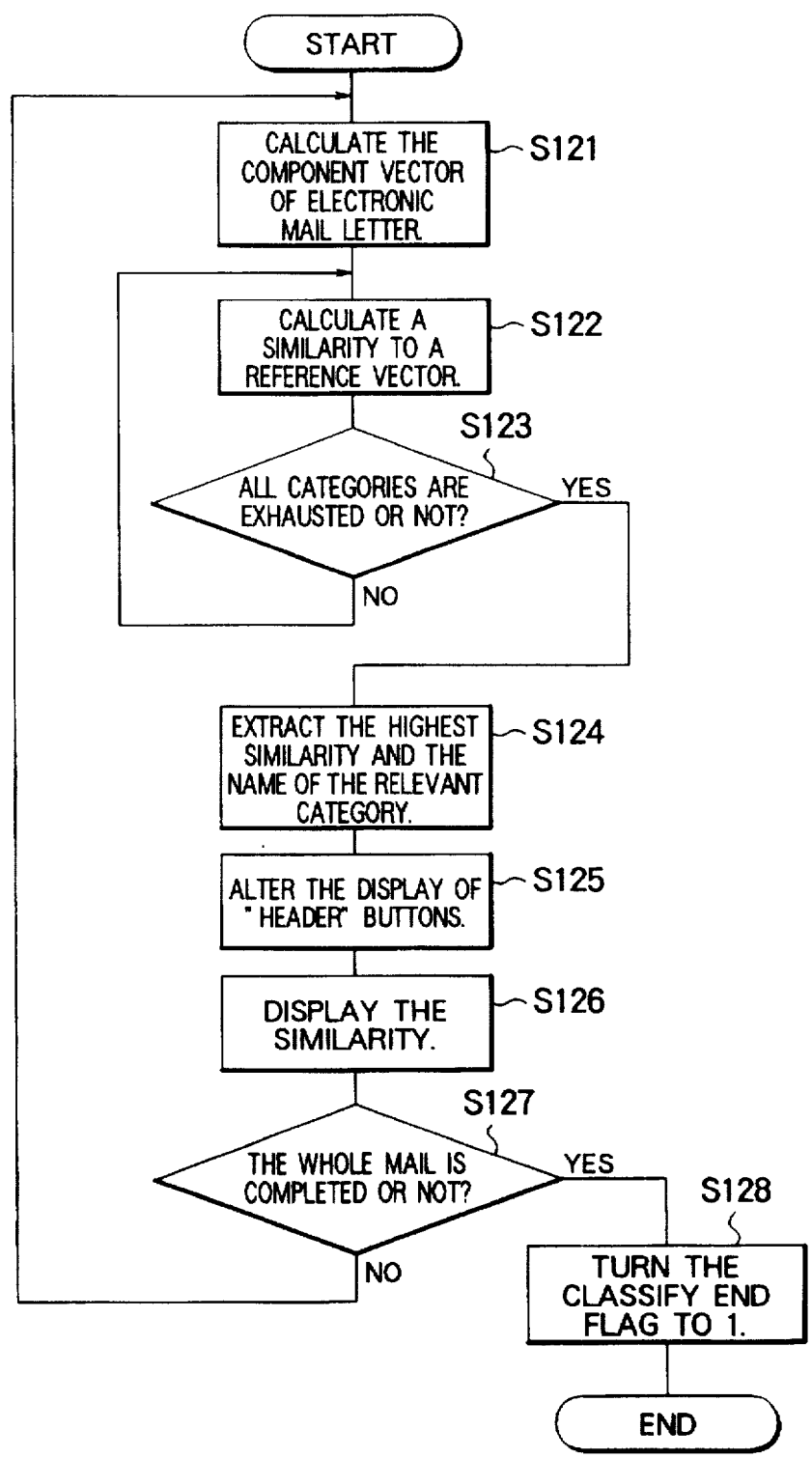
FIG. 38 is a flowchart showing operations of an eighth embodiment of an electronic secretary system according to the present invention.

Next, actions of classifying will be described along the flowchart of FIG. 38.

When a user presses a "Classify" button while the header information of electronic mail having the mail flag of 1 is displayed in the list, first, data of the first electronic mail letter are retrieved from the electronic mail storing section 129 and the component vector is calculated (step S121). Incidentally, categories of classifying are set by a user in advance, a reference vector is calculated for each category, and the data shall be possessed by the classifying section 131. A similarity between the component vector of an electronic mail letter and the reference vector of each category is calculated (step S122). In evaluating the similarity, various methods, such as by computing the inner product or difference of vectors, are considered, but either method is possible. If the similarity is calculated concerning all categories (step S123), the name of the highest category in similarity and a value of similarity are extracted (step S124).

The display of "header" buttons is so modified as to easily find the relevant category from the extracted category names in the display section 108 (step S125). For example, such processing as collectively displaying those of the same category or distinguishing different categories by color, is performed. Also, the similarity is simultaneously displayed (step S126), or the degree of closeness to a certain category is made clear. These calculations are performed for all listed electronic mail letters. When all calculations end (step S127), the classifying end flag is turned into 1 (step S128). "Classifying End" is written into the internal state storing section 104 and in accordance with data stored in the action description storing section 106 as shown in FIG. 35, the electronic secretary finishes the action of "During Classifying". Incidentally, not only an electronic mail letter not yet read but also those already read can be also classified. The processing of this case is also performed like the above.

Next, the classifying processing will be described using a concrete example.

As shown in FIG. 39, an electronic mail letter comprises an electronic mail text and a "header" button. FIG. 39(b) shows a displayed example of 3 items, a transmitter, a received date and the content, extracted as header information. As shown in FIG. 40, the categories for classifying shall be set by a user. In the classifying section 131, the component vector is calculated concerning the electronic mail letter of FIG. 39(a). The similarity between this component vector and the reference vectors of three categories in FIG. 40 is respectively evaluated. As shown in FIG. 41(a), it is obtained as the calculated results that the similarity is 66 for the category 1 (VR relation), 27 for the category 2 (neuro relation) and 50 for the category 3 (others). The highest similarity among them is a similarity of 66 for the category 1, and accordingly this letter is classified into the category 1, so that the category 1 and similarity 66 are extracted. FIG. 41b shows the extracted results. Seeing the result as indicated in FIG. 41(b), the display section 108 displays "header" buttons shown in FIG. 39(b) at the category 1 as shown in FIG. 41c, where "header" buttons of the electronic mail classified according to categories are displayed in the respective categories. A "score" indicated by the side of a "header" button represents the similarity. In FIG. 41c, the arrangement of electronic mail letters in each category is in the order of arrival. As shown in FIG. 41d, a method for display electronic mail letters in sequence from the highest similarity can be also considered. In this case, it is advisable that after category names and similarity are extracted for all electronic mail letters, values of similarity are compared for the electronic mail letters belonging to the same category and the letters are arranged in sequence from the highest similarity in each category.

Next, the above example of action will be described in an actual display screen.

Figure 42:
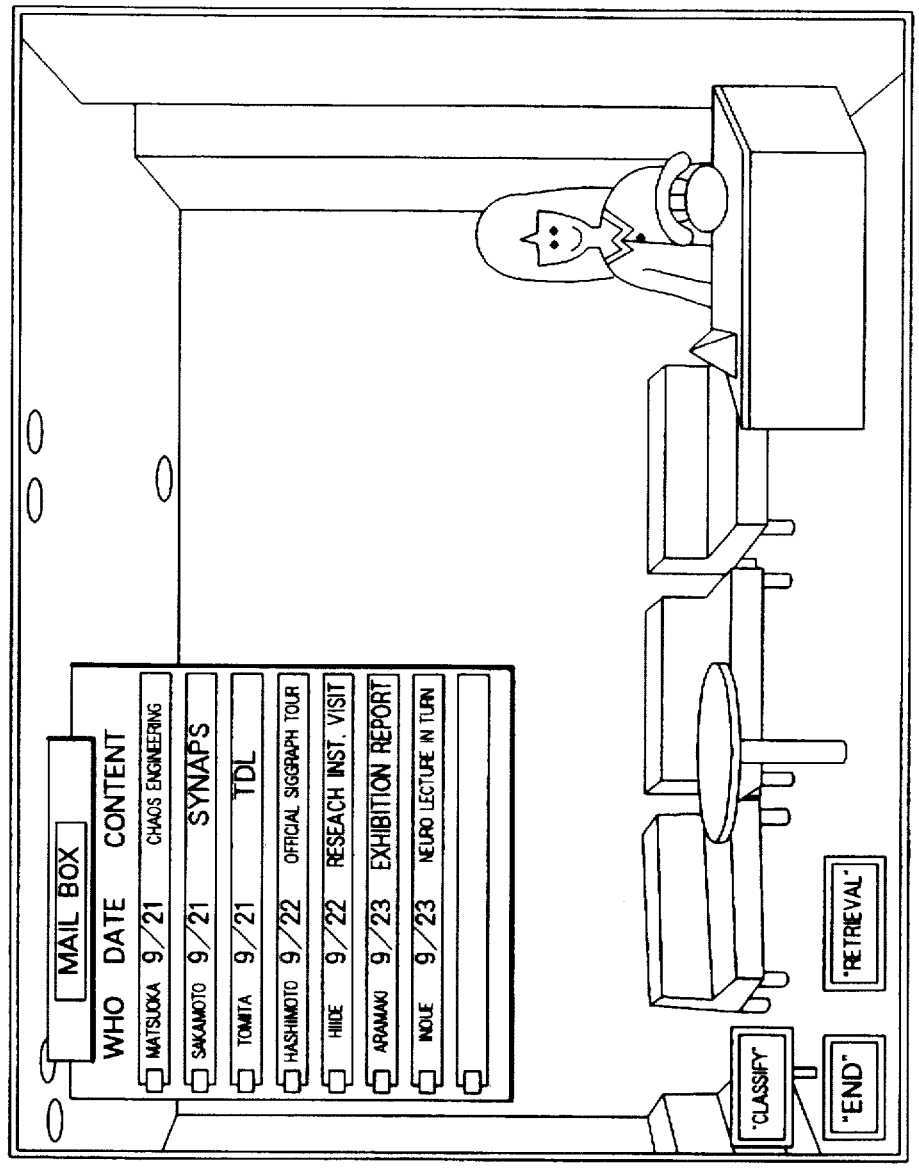
FIG. 42 is to illustrate practical display images of an electronic secretary system according to the present invention.
Figure 43:
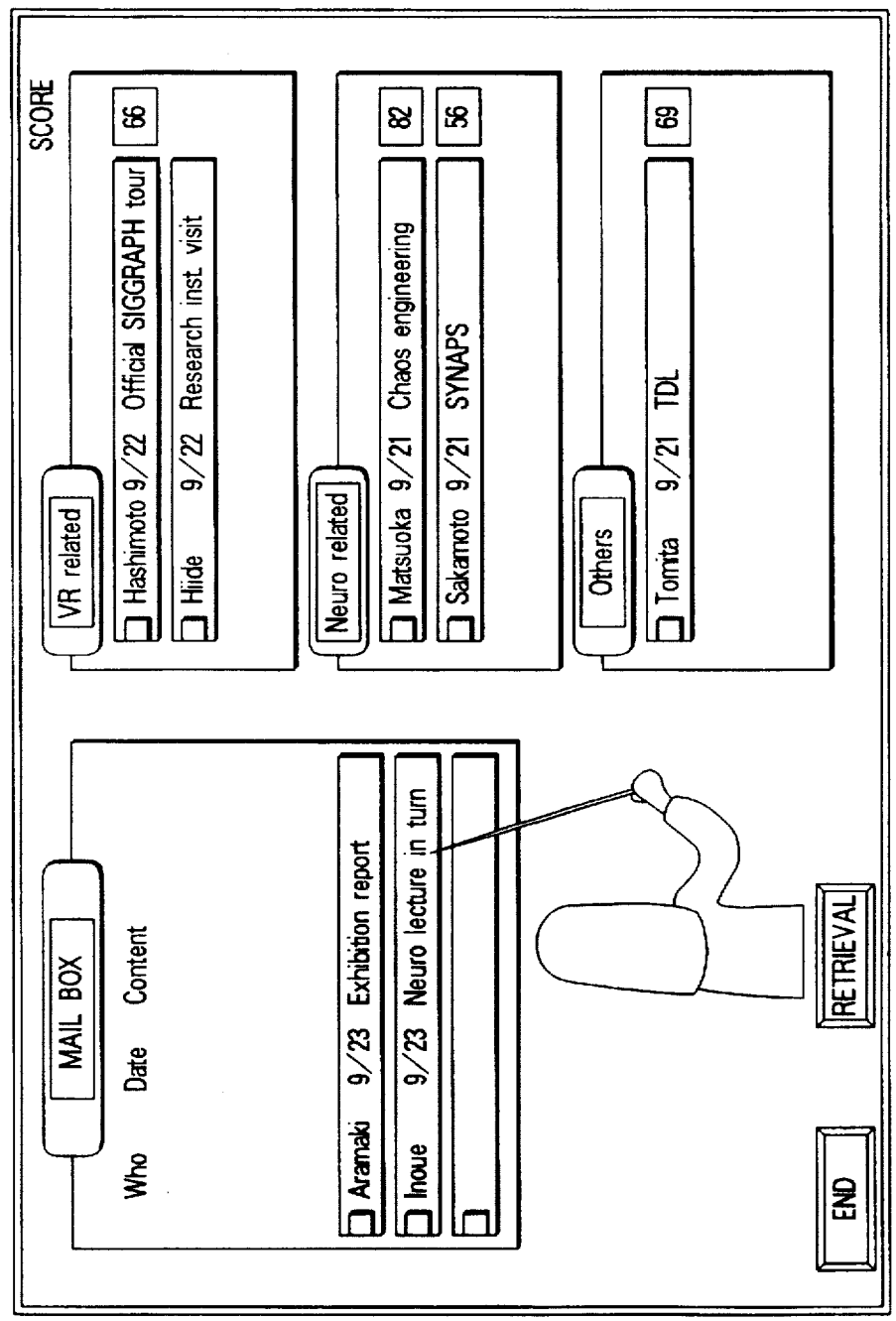
FIG. 43 is to illustrate practical display images of an electronic secretary system according to the present invention.
Figure 44:
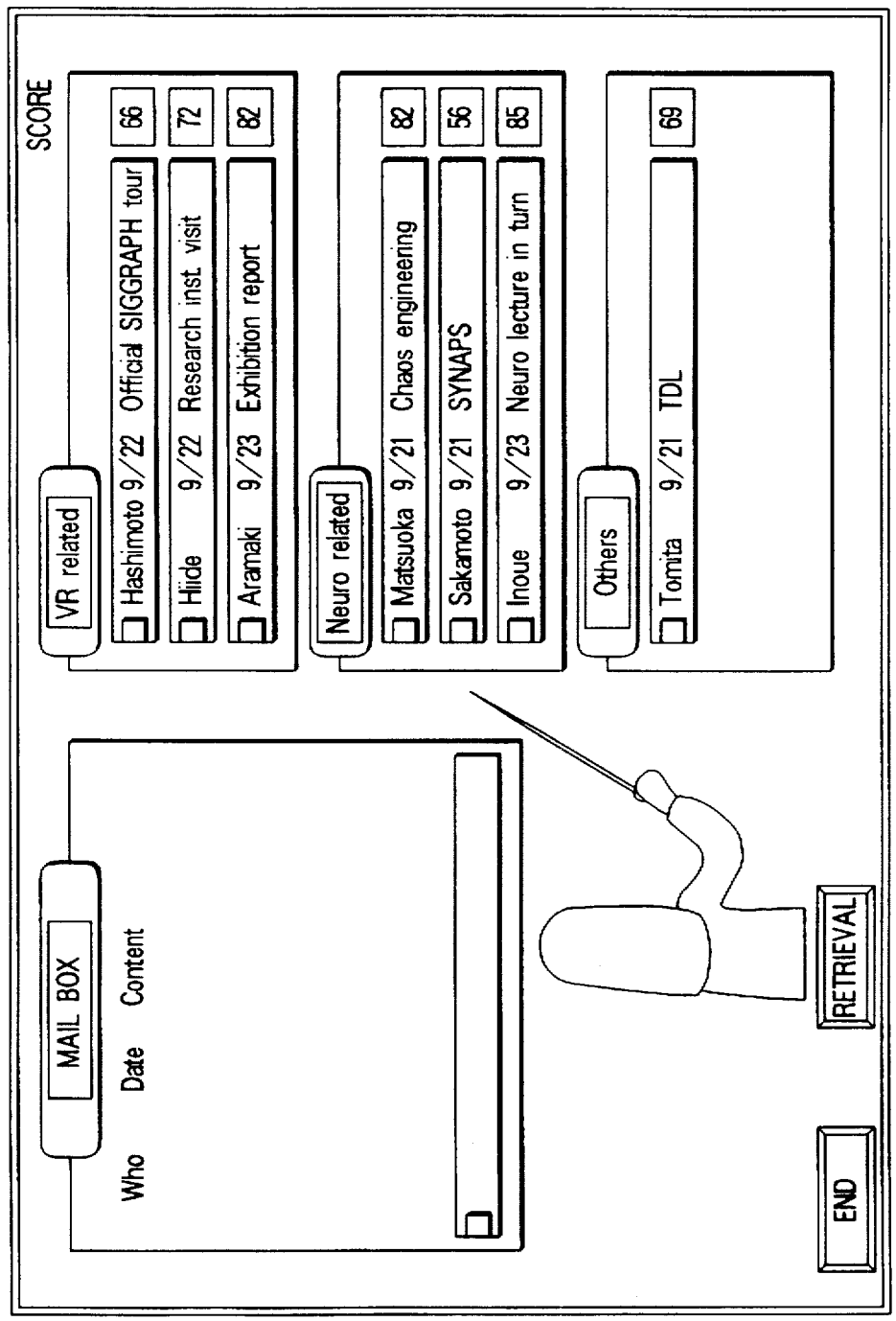
FIG. 44 is to illustrate practical display images of an electronic secretary system according to the present invention.
Figure 45:
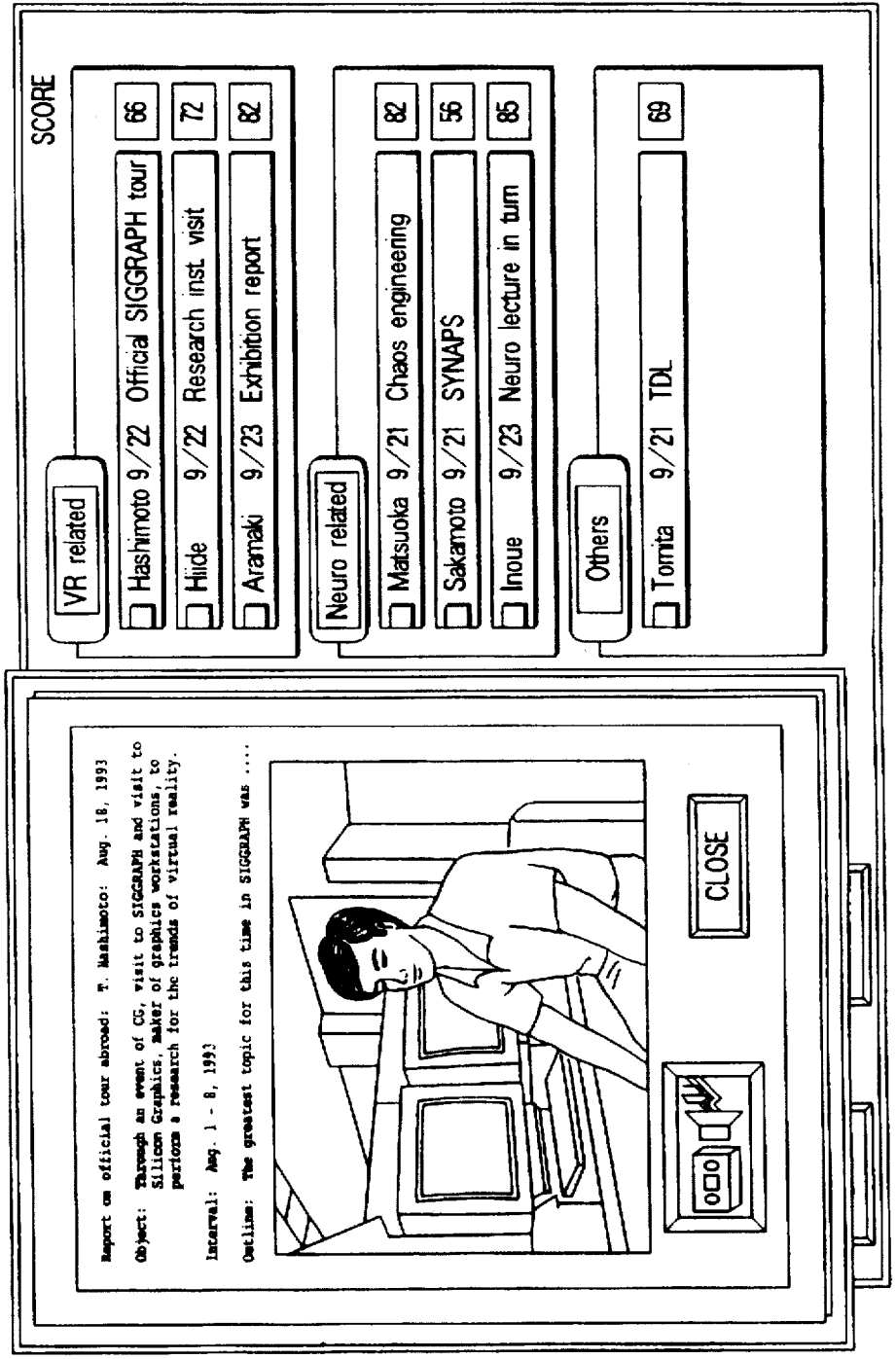
FIG. 45 is to illustrate practical display images of an electronic secretary system according to the present invention.
Figure 46:
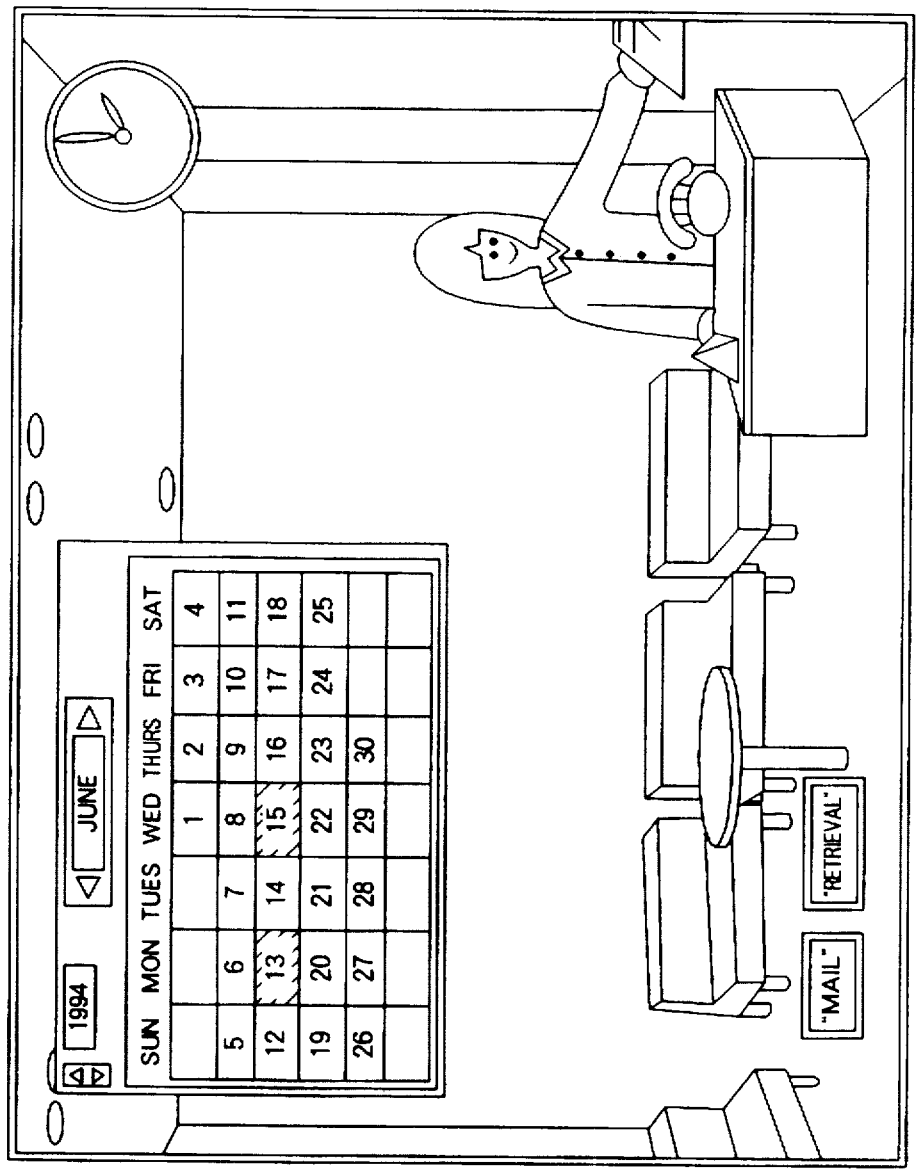
FIG. 46 is to illustrate practical display images of an electronic secretary system according to the present invention.
Figure 47:
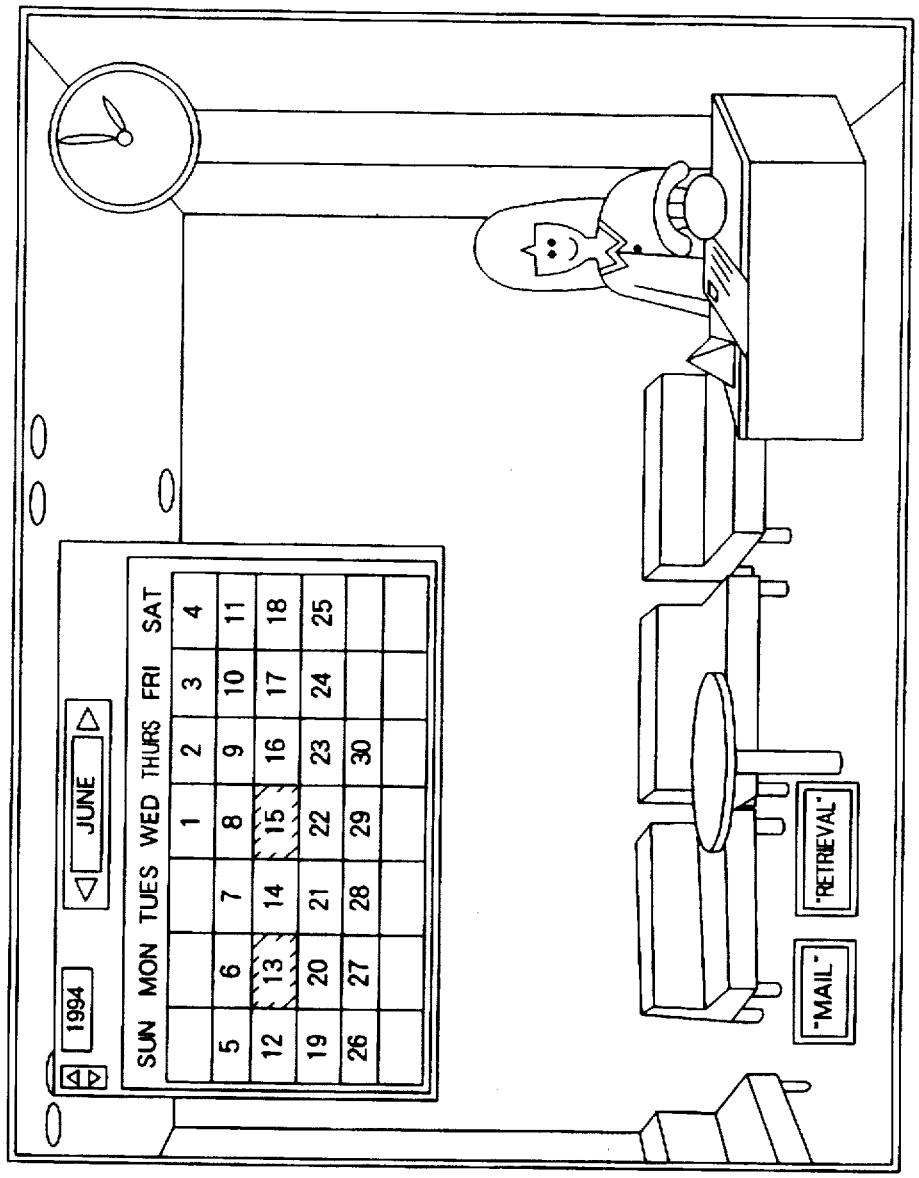
FIG. 47 is to illustrate practical display images of an electronic secretary system according to the present invention.

When a user presses a "Mail" button, a mail screen as shown in FIG. 42 is opened, the list of header information in electronic mail letters not yet read is displayed. Hereupon, when pressing a "Classify" button, the manner of an electronic secretary to classify the "header" buttons is displayed as shown in FIG. 43. FIG. 44 shows the classified results, where electronic mail letters are separately displayed under classification by categories of their "header" buttons. The item indicated by scores is a similarity, while classified categories and similarity are indicated. Herein, when a user presses a definite "header" button, a window for showing the content of electronic mail letters corresponding to a pressed "header" button is displayed as shown in FIG. 45. At this time, a check mark is put on the pressed "header" button, which indicates the relevant electronic mail letter has been read. When pressing a "Reproduce" button denoted by a picture of speaker, image data, audio data or the like are reproduced. When pressing a "Close" button, the mail screen closes and the processing of electronic mail letters ends. As shown in FIG. 46, an example of display when a new electronic mail arrived displays a postal card receiving manner of an electronic secretary. As shown in FIG. 47, an example of display when an electronic mail having the mail flag of 1 is included in the electronic mail storing section 129 displays an image that a postal card is placed on the desk of the electronic secretary, which informs a user of electronic mail arrival.

Figure 48:
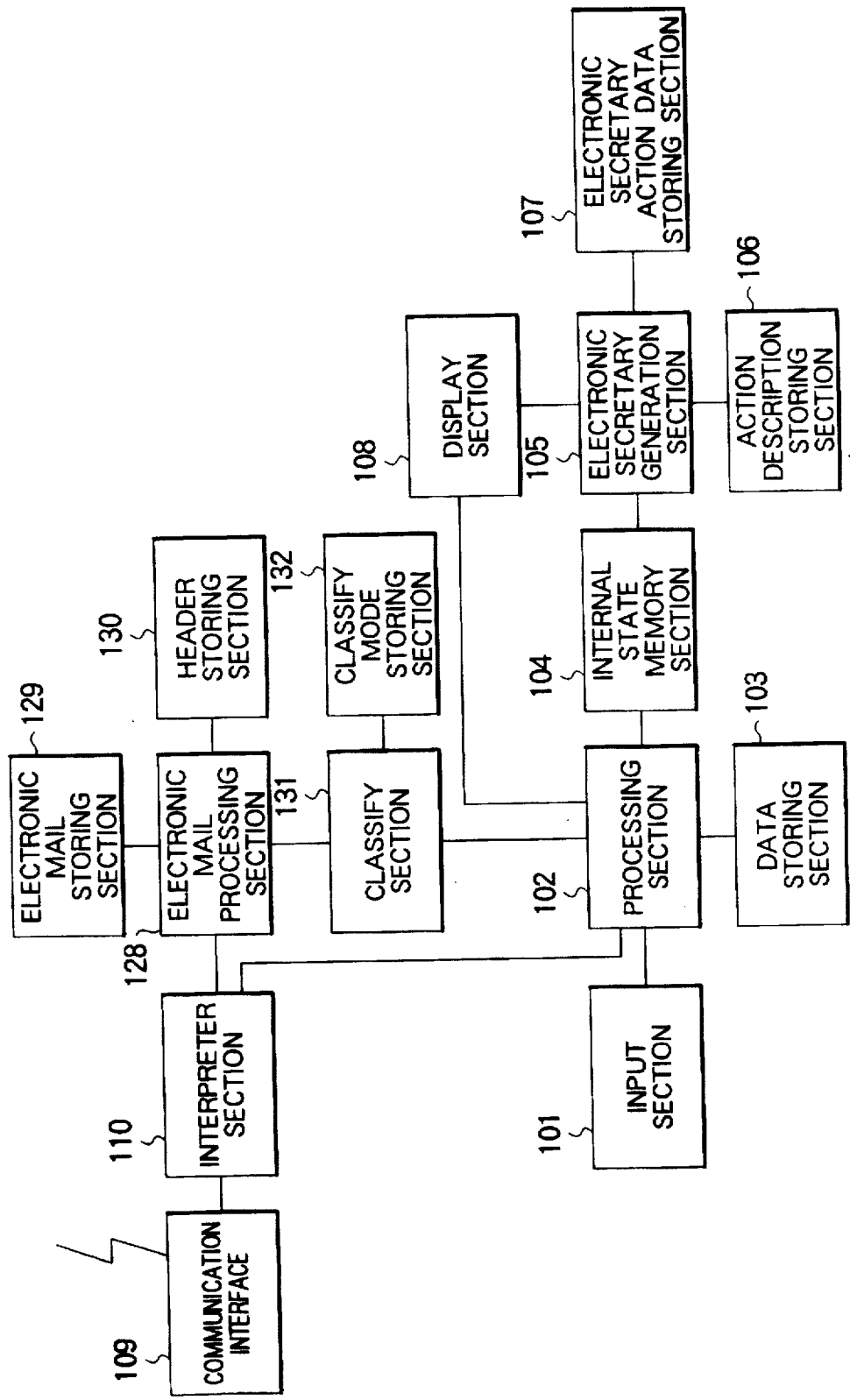
FIG. 48 is a block diagram showing a ninth embodiment of an electronic secretary system according to the present invention.

Next, a ninth embodiment of an electronic secretary system according to the present invention will be described referring to FIG. 48. Incidentally, by putting like symbols to constituents similar to those of FIG. 34, description is omitted.

The present embodiment is featured by comprising the classify mode storing section 132 as classify mode storing means for storing the classify mode in accordance with an instruction to be inputted from the input section 101. In the classify mode storing section 132, values set on classify modes in the classify section 131, estimating function, and method for indicating the classified results are stored.

Next, the procedure for setting a classify mode will be described along the flowchart of FIG. 49.

When a user selects the "Classify Mode Setting" (step S131), "Classify Mode Setting" is written into the internal state memory section 104 (step S132). In accordance with data stored in the action description storing section 106 as shown in FIG. 35, a screen for setting a classify mode is displayed and the list of classify modes stored in the classify mode storing section 132 is displayed. As shown in FIG. 50, examples of classify modes include "By Content", classifying by the content of electronic mail letters; "By Transmitter", classifying by transmitters; "By Group", classifying by the belonging group of transmitters; and "By Date", classifying by the received date of electronic mail letters. It is advisable that, by preparing the item of "User Setting", a user himself can set a classify mode. When a classify mode is selected by a user from the list of classify modes (step S133), an alternation in classify mode is performed in the classify mode memory section 132 (step S134). Thereafter, an alteration in estimation function is performed according to a set classify mode (step S135).

FIG. 51 shows an example of estimation function. In the mode 1, "By Content", as described in a first embodiment, the similarity between the component vector of a sentence and the reference vectors is calculated and the relevant mail letter is classified in a category of the highest similarity. In the mode 2, "By Transmitter", one letter is picked up from among the electronic mail to be classified and the similarity with others is calculated. In this case, seeing the header information, to the similarity is assigned 1 for electronic mail letter of the same transmitter and 0 for that of a different transmitter, where the electronic mail having a similarity of 1 are collectively classified in one and the same category. This operation is continued till the whole electronic mail is classified. In the mode 3, "By Group", after registering the members of each group in advance, electronic mail letters are classified referring to a name of transmitter among the header information into belonging groups. In the mode 4, "By Date", seeing dates of the header information as with the mode 2, to the similarity is assigned 1 for those of the same date and 0 for others, where the electronic mail having a similarity of 1 are collectively classified in one and the same category.

Figure 52A:
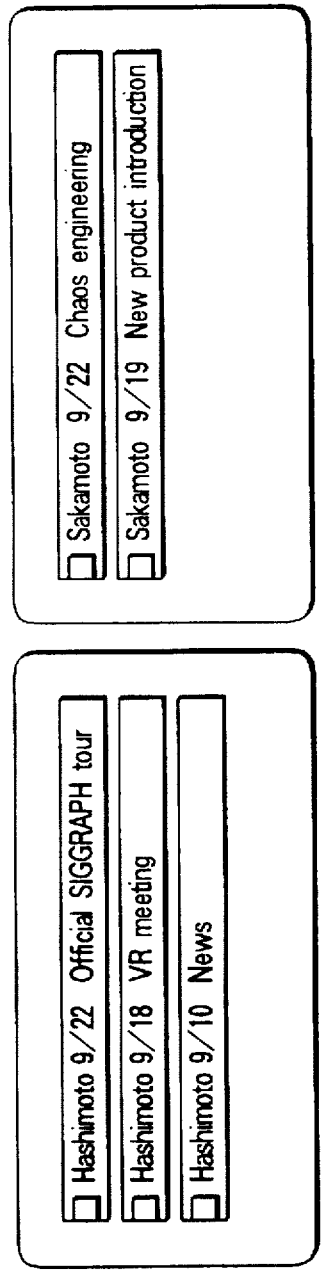
FIG. 52a is to illustrate displaying examples for each classify mode.
Figure 52B:
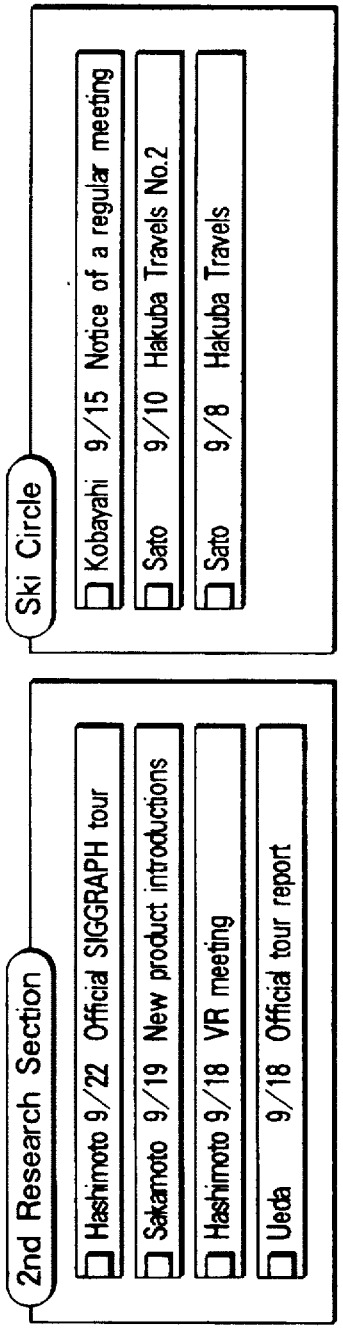
FIG. 52b is to illustrate displaying examples for each classify mode.
Figure 52C:
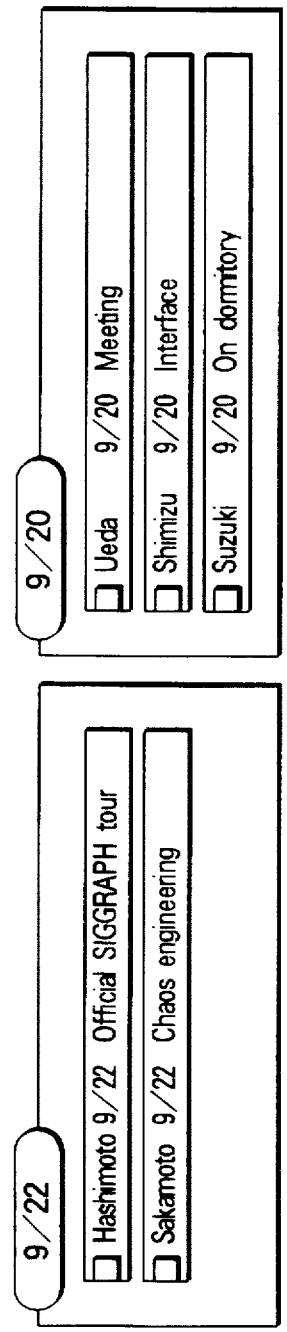
FIG. 52c is to illustrate displaying examples for each classify mode.

In relation to the memorized classify mode, an estimation function is set in advance but can be altered by a user. Then, returning to FIG. 49, a display method is altered in accordance with a classify mode (step S136). In dependence on a classify mode, examples of display methods are as follows: In the mode 1, "By Content", "header" buttons are collected in display for each category as shown in FIGS. 41*c* and 41*d*. In the mode 2, "By Transmitter", "header" buttons are listed in display for each transmitter as shown in FIG. 52*a*. In the mode 3, "By Group", "header" buttons are divided in display for each group as shown in FIG. 52*b*. In the mode 4, "By Date", "header" buttons are divided in display for each date as shown in FIG. 52*c*. Similarly in other modes, a display method is set for each mode. Thereafter, the display of similarity is set. If set to "the similarity is not displayed", such can be set that the similarity is not displayed. Meanwhile, when the similarity represents the closeness to the relevant category as with a eighth embodiment, an electronic mail letter having a higher similarity may be regarded as high in priority. At this time, it can be set in such a manner as to display the electronic mail in sequence from the highest similarity.

Figure 49:
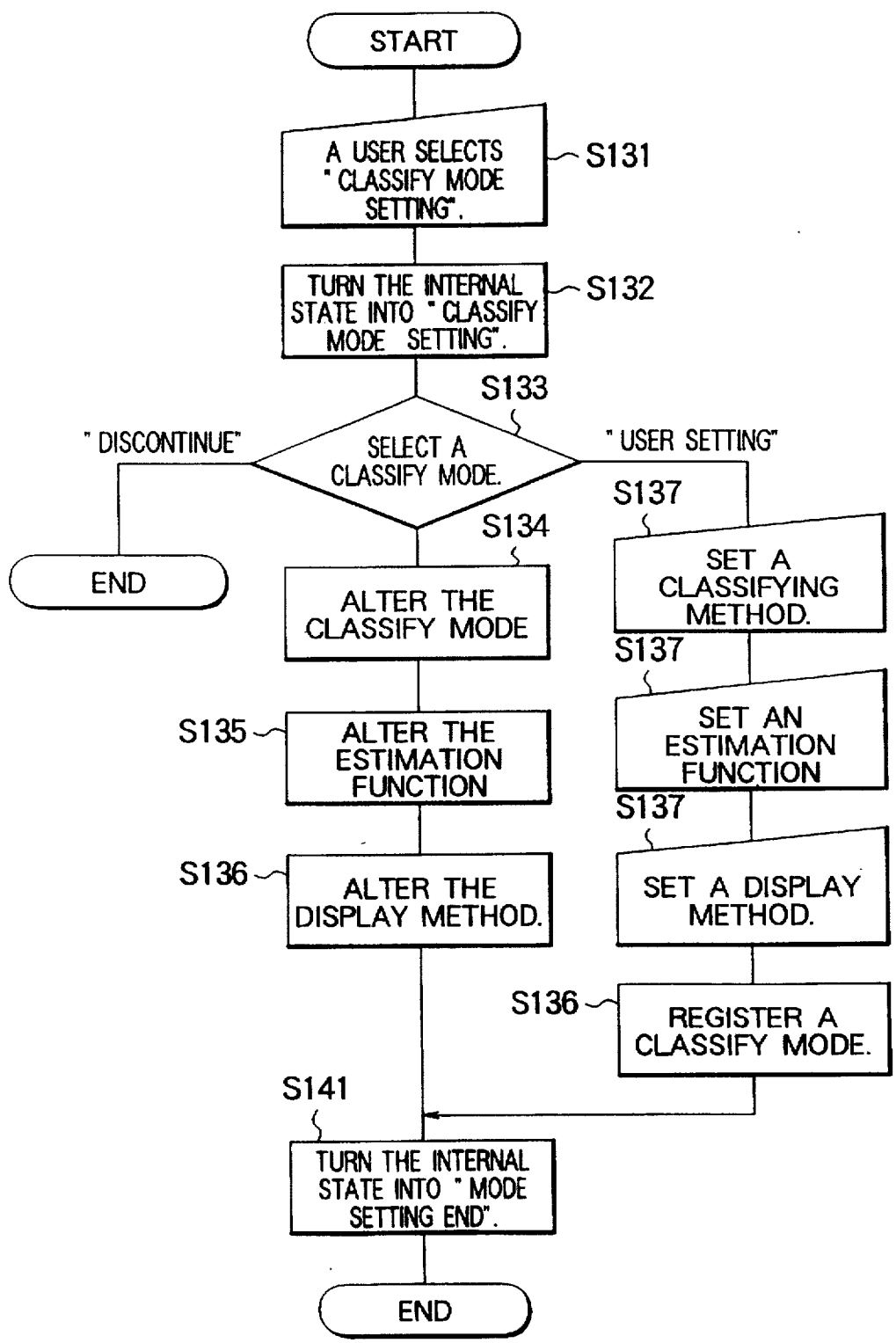
FIG. 49 is a flowchart showing operations of an eighth embodiment of an electronic secretary system according to the present invention.

Furthermore, in the above step S133 of FIG. 49, when selecting a "User Setting", a user sets a classifying method from the input section 101 (step S137). Hereupon, setting of an estimation function (step S138) and setting of a display method (step S139) are respectively performed. The classify mode set by a user is registered in the classify mode storing section 132 (step S140), to which a mode number is assigned. In this way, if a classify mode is set, "Mode Setting Completion" is written into the internal state storing section 104 (step S141). The screen for setting a classify mode closes and the processing ends. In selection of a classify mode, when selecting "Discontinue", an alteration in classify mode is not performed and the processing ends.

Actions to be performed when a user presses a "Classify" button were described, but such setting is thinkable that classification can proceed when a user presses a "Mail" button. In this case, the classified results are arranged to be displayed instead of the list of electronic mail.

Many widely different embodiments of the present invention may be constructed without departing from the spirit and scope of the present invention. It should be understood that the present invention is not limited to the specific embodiments described in the specification, except as defined in the appended claims.

What is claimed is:

1. An electronic secretary system for performing a series of processing and for allowing a user to see the system's processing state by displaying an electronic secretary who is shown imitating human action, comprising:

input means for inputting information, such as user's instruction;

processing means responsive to the input information for performing a predetermined processing;

data storing means for storing data to be processed;

internal state memory means for memorizing the internal state of processing;

first action description storing means for storing a human action which said electronic secretary is to be shown imitating, the human action corresponding to the state of said processing;

first electronic secretary generation means for generating human actions to be imitated by said electronic secretary based upon the state of processing memorized in said internal state memory means and the stored human action corresponding to the state of processing; and a display for displaying said electronic secretary as an image imitating the human action generated by said first electronic secretary generation means, whereby the user sees the system's state of processing, and for displaying data.

2. The electronic secretary system as set forth in claim 1, further comprising:

means for communicating with at least one other electronic secretary system;

second action description storing means for storing data describing the human action to be imitated by a second electronic secretary belonging to the other electronic secretary system with which said means for communicating is in communication; and second electronic secretary generation means for generating human action to be imitated by said second electronic secretary.

3. The electronic secretary system as set forth in claim 1, further comprising:

mode memory means for memorizing the user's work environment.

4. The electronic secretary system as set forth in claim 1, further comprising:

internal state generation means for generating the internal state in accordance with a predetermined rule.

5. The electronic secretary system as set forth in claim 1, further comprising communication means for communication with at least one other electronic secretary system, wherein said processing means is responsive to a data retrieval command inputted into said input means or into the other electronic secretary system connected through said communication system.

6. The electronic secretary system as set forth in claim 1, further comprising communication means for communicating with at least one other electronic secretary system, wherein said processing means is able to perform the registration, deletion or retrieval of a schedule corresponding to said electronic secretary system or the other electronic secretary system connected through said communication means.

7. The electronic secretary system as set forth in claim 1, further comprising:

history memory means for memorizing the history of the internal state; wherein in response to request from a user, what action the electronic secretary has made is displayed on said display means by referring to the history memorized on said history memory means.

8. The electronic secretary system as set forth in claim 1, further comprising:

communicator means for communicating with at least one other electronic secretary system;

electronic mail processing means for processing an electronic mail sent/received through said communicator means; and classifying means for classifying an electronic mail processed by said electronic mail means.

9. The electronic secretary system as set forth in claim 8, further comprising:

classifying mode memory means for memorizing a classification mode by referring to the instruction inputted from said input means.

10. The electronic secretary system as set forth in claim 2, wherein said second electronic secretary is displayed, on said display, as an image imitating the human action generated by said second electronic secretary generation means.

11. The electronic secretary system as set forth in claim 1, wherein the actions imitated by said electronic secretary includes a wink and a raising of a hand.

* * * * *